US012518456B2

(12) United States Patent
Kapadia et al.

(10) Patent No.: US 12,518,456 B2
(45) Date of Patent: Jan. 6, 2026

(54) GENERATION OF AVATAR ANIMATIONS USING MOTION MODIFIERS

(71) Applicant: Roblox Corporation, San Mateo, CA (US)

(72) Inventors: Mubbasir Turab Kapadia, San Mateo, CA (US); Sonia Kini-Sharma Mahir, Berkeley, CA (US); Hubert Derenne, San Francisco, CA (US); Aaron Carrasquillo Koressel, El Cerrito, CA (US); Emiliano Gambaretto, San Francisco, CA (US)

(73) Assignee: Roblox Corporation, San Mateo, CA (US)

( * ) Notice: Subject to any disclaimer, the term of this patent is extended or adjusted under 35 U.S.C. 154(b) by 187 days.

(21) Appl. No.: 18/235,729

(22) Filed: Aug. 18, 2023

(65) Prior Publication Data

US 2025/0061637 A1 Feb. 20, 2025

(51) Int. Cl.
*G06T 13/40* (2011.01)
*G06T 19/20* (2011.01)

(52) U.S. Cl.
CPC .............. *G06T 13/40* (2013.01); *G06T 19/20* (2013.01); *G06T 2219/2004* (2013.01)

(58) Field of Classification Search
CPC .. G06T 13/40; G06T 19/20; G06T 2219/2004
See application file for complete search history.

(56) References Cited

U.S. PATENT DOCUMENTS

| 2007/0159487 A1* | 7/2007 | Felt | G06T 13/80 |
| | | | 345/474 |
| 2018/0025525 A1* | 1/2018 | Hessler | G06T 19/20 |
| | | | 345/420 |

OTHER PUBLICATIONS

"A beginner's guide to Dreams", Sony Interactive Entertainment, retrieved Oct. 25, 2023, https://www.playstation.com/en-us/editorial/this-month-on-playstation/dreams-beginners-guide/, 2023, 11 pages.
Kovar, Lucas, "Automated Methods for Data-Driven Synthesis of Realistic and Controllable Human Motion," Chapter 6: Parameterized Motion, dissertation at University of Wisconsin-Madison, 2004, pp. 116-147.

(Continued)

*Primary Examiner* — Chong Wu
(74) *Attorney, Agent, or Firm* — IP Spring

(57) ABSTRACT

Generation of avatar animations for virtual environments using motion modifiers. In some implementations, a computer-implemented method includes determining a base animation defined by animation curves that each include position values that indicate positions of an associated portion of an avatar at points of time. One or more motion modifiers and parameters therefor are determined, each motion modifier composed of one or more modification primitives configured to modify respective animation curves of the base animation that are associated with respective portions of the avatar. A modified animation is generated by applying the motion modifiers to the base animation, where each of the modification primitives of each motion modifier modifies a respective animation curve for an associated portion of the avatar based on the parameters of the motion modifiers.

20 Claims, 7 Drawing Sheets

(56) References Cited

OTHER PUBLICATIONS

"Dreams", Wikipedia: The Free Encyclopedia. Wikipedia, The Free Encyclopedia, page last edited Oct. 12, 2023, retrieved Oct. 25, 2023, https://en.wikipedia.org/wiki/Dreams_(video_game), 2023, 8 pages.
"Dreams Documentation: Create, Resources, Up & Animate 'Em—A Guide", Sony Interactive Entertainment Europe, Dreams Docs Version 11.3.40611, retrieved Oct. 25, 2023, https://docs.indreams.me/en-US/create/resources/recording-modes, 2023, 16 pages.
"Dreams, overview", Sony Interactive Entertainment, retrieved Oct. 25, 2023, https://www.playstation.com/en-us/games/dreams/, 2023, 15 pages.
"Mixamo", Wikipedia: The Free Encyclopedia. Wikipedia, The Free Encyclopedia, page last edited May 1, 2023, retrieved Oct. 25, 2023, https://en.wikipedia.org/wiki/Mixamo, 2023, 3 pages.
"Mixamo", Adobe Systems Incorporated, retrieved Oct. 25, 2023, https://www.mixamo.com/#/, 2023, 6 pages.
Bruderlin, et al., "Motion Signal Processing", Proceedings of the 22nd annual conference on Computer graphics and interactive techniques, 1995, 8 pages.
Chen, et al., "Cage-based deformation transfer", Computers & Graphics 34.2, 2010, pp. 107-118.
Garcia, et al., "Spatial Motion Doodles: Sketching Animation in VR Using Hand Gestures and Laban Motion Analysis", Proceedings of the 12th ACM Siggraph Conference on Motion, Interaction and Games, 2019, 11 pages.
Gleicher, et al., "Motion Editing with Spacetime Constraints", Proceedings of the 1997 symposium on Interactive 3D graphics, 1997, 1-10 pages.
Guay, et al., "Adding dynamics to sketch-based character animations", Sketch-Based Interfaces and Modeling (SBIM) 2015, Eurographics Association, 2015, 9 pages.
Guay, et al., "Space-time sketching of character animation", ACM Transactions on Graphics (ToG) 34.4, 2015, 10 pages.
Guay, et al., "The Line of Action: an Intuitive Interface for Expressive Character Posing", Siggraph Asia 2013, 2013, 47 pages.
Guay, et al., "The Line of Action: an Intuitive Interface for Expressive Character Posing", ACM Transactions on Graphics (TOG) 32.6, 2013, pp. 1-8.
Holden, et al., "Fast Neural Style Transfer for Motion Data", IEEE computer graphics and applications 37.4, 2017, pp. 42-49.
Hsu, et al., "Style Translation for Human Motion", ACM Siggraph 2005 Papers, 2005, pp. 1082-1089.
Li, et al., "Task-Generic Hierarchical Human Motion Prior using VAEs", 2021 International Conference on 3D Vision (3DV), IEEE, 2021, 11 pages.
Neff, et al., "Interactive Editing of Motion Style Using Drives and Correlations", Proceedings of the 2009 ACM Siggraph/Eurographics Symposium on Computer Animation, 2009, 10 pages.
Nitsche, et al., "Manipulating Puppets in VR", 2020 IEEE Conference on Virtual Reality and 3D User Interfaces (VR), 2020, 8 pages.
Smith, et al., "Efficient Neural Networks for Real-time Motion Style Transfer", Proceedings of the ACM on Computer Graphics and Interactive Techniques 2.2, 2019, pp. 1-17.
Thorne, et al., "Motion Doodles: an Interface for Sketching Character Motion", ACM Transactions on Graphics (ToG) 23.3, 2004, pp. 424-431.
Wang, et al., "The Cartoon Animation Filter", ACM transactions on graphics (TOG) 25.3, 2006, pp. 1169-1173.
White, et al., "Slow In and Slow Out Cartoon Animation Filter", ACM Siggraph 2006 Research posters, 2006, 2 pages.
Witkin, et al., "Motion Warping", Proceedings of the 22nd annual conference on Computer graphics and interactive techniques, 1995, 4 pages.
Witkin, et al., "Spacetime Constraints", ACM Siggraph Computer Graphics 22.4, 1988, pp. 159-168.
Yumer, et al., "Spectral Style Transfer for Human Motion between Independent Actions", ACM Transactions on Graphics (TOG) 35.4 (2016), 2016, 8 pages.

* cited by examiner

GENERATION OF AVATAR ANIMATIONS USING MOTION MODIFIERS

TECHNICAL FIELD

This disclosure relates to the field of animation of objects in virtual computer environments and virtual experiences, and in particular, to methods, systems, and computer readable media for modifying and generating animations of avatars in virtual environments.

BACKGROUND

Virtual objects are provided in many virtual environments including game environments, virtual worlds and experiences, and interactive online environments. Objects such as avatars may have a humanoid appearance, or other appearance (e.g., animal, robot, alien, or any other user-configurable appearance). Avatars within the virtual environment may be animated and can perform various actions, including walking, running, jumping, moving arms or legs (or other parts of an avatar body, e.g., hands, fingers, head, etc.), or any of a variety of complex animations that may include a combination of different types of motions of different portions of the avatar (e.g., walking by moving legs, moving arms, rotating a torso, rotating a head on a neck, etc.).

Current techniques for generating animations of avatars have several disadvantages. For example, in order to create an animation having a particular style (e.g., a particular speed or magnitude of movements, or expressing a particular emotion or mood of the avatar being animated, etc.), a user must manually edit an existing animation and store the edited animation as a separate animation, or specify an entirely new animation in a particular format. If a developer wants to change the style of all the animations in a game, they must author a new version of every single animation in the game. If a developer wants a slightly different style expressed by the animation, such as changing an animation expressing a very sad emotion into one that expresses a slightly sad emotion, they have to create a completely different animation. Furthermore, this complexity of stylizing and customizing the motion of avatars increases combinatorially with an increase in number of style combinations, requiring an unwieldy and space-consuming number of individual animations to be stored, transmitted, and processed to cover the range of possible movements.

The background description provided herein is to present the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to generation of avatar animations for virtual environments using motion modifiers. In some implementations, a computer-implemented method includes, by at least one processor, determining a base animation defined by a plurality of animation curves, each animation curve including position values that indicate positions of an associated portion of an avatar at multiple points of time. The method includes determining one or more motion modifiers, each of the motion modifiers composed of one or more modification primitives configured to modify a respective animation curve of the base animation, the respective animation curve associated with a respective portion of the avatar. The method includes determining one or more respective parameters of the one or more motion modifiers. The method includes modifying the base animation to generate a modified animation, including applying the one or more motion modifiers to the base animation, where each of the one or more modification primitives of each motion modifier modifies the respective animation curve based on at least one of the one or more respective parameters of the motion modifier.

Various implementations and examples of the method are described. For example, in some implementations, each of the one or more modification primitives modifies at least one of: one or more position values of the associated portion of the avatar, a timing of a motion in the base animation, or a frequency of motion provided by the respective animation curve. In some implementations, determining the base animation includes one of: obtaining, as the base animation, an existing animation that has been previously generated, or generating the base animation, including generating a plurality of generic animation curves having no specified position values, or default position values, for the associated portions of the avatar. In some implementations, the avatar is included in a virtual environment, and further comprising applying the modified animation to the avatar to cause the avatar to move according to the modified animation in the virtual environment.

In some implementations, the base animation includes streaming animation data received by the at least one processor, and modifying the base animation is performed as the streaming animation data is received. In some implementations, at least one of the one or more respective parameters specifies a magnitude of the modifying of the animation curve by the one or more modification primitives. In some implementations, at least one of the one or more respective parameters is based on user input received from a user by a device that includes the at least one processor. In some implementations, determining the one or more respective parameters includes generating at least one of the one or more respective parameters based on statistical motion data derived from motion provided by the base animation.

In various implementations, applying the one or more motion modifiers includes: applying a position value scale modification primitive that scales the position value of the respective animation curve of the base animation by a scale factor included in the one or more respective parameters; applying a value offset modification primitive that offsets position values of the respective animation curve of the base animation by a particular amount included in the one or more respective parameters; applying a time modification primitive that modifies a timing of the respective animation curve of the base animation based on the one or more respective parameters; and/or applying a frequency modification primitive that modifies a frequency of a motion provided by the respective animation curve of the base animation by an amount indicated in the one or more respective parameters.

In some implementations, the modified animation is an emotion-based animation that indicates an emotion of the avatar via motion of the avatar provided by the modified animation. In some implementations, the emotion-based animation includes particular motion of one or more arms of the avatar generated by a first plurality of motion modifiers modifying the base animation by changing motion of the one or more arms of the avatar; and/or particular motion of a head or a torso of the avatar generated by a second plurality of motion modifiers modifying the base animation by changing motion of the head or the torso of the avatar.

In some implementations, the plurality of motion modifiers include a first set of motion modifiers and a second set of motion modifiers, and modifying the base animation includes blending a first animation into a second animation, where the first animation is generated by applying the first set of motion modifiers to the animation curves to produce first animation curves; and the second animation is generated by applying the second set of the motion modifiers to the first animation curves to produce second animation curves.

In some implementations, determining the one or more motion modifiers is based, at least in part, on a current state of the avatar in the virtual environment, and/or a current state of the virtual environment. In some implementations, at least one parameter of the one or more parameters is a function of an attribute of motion of the avatar in the base animation, the attribute of motion based on statistical motion data derived from motion of an associated body part of the avatar in the base animation. In some implementations, the one or more motion modifiers include a higher level motion modifier that applies a plurality of lower level motion modifiers to the base animation, each of the lower level motion modifiers applying at least one of the modification primitives to the base animation.

In some implementations, a system comprising at least one processor coupled to a memory having stored thereon software instructions that, when executed by the at least one processor, cause the at least one processor to perform operations. The operations include determining a base animation defined by a plurality of animation curves, each animation curve including position values that indicate positions of an associated portion of an avatar at multiple points of time. The operations include determining one or more motion modifiers, each of the motion modifiers composed of one or more modification primitives configured to modify a respective animation curve of the base animation, the respective animation curve associated with a respective portion of the avatar. The operations include determining one or more respective parameters of the one or more motion modifiers, at least one of the one or more respective parameters specifying a magnitude of an animation modification by a respective modification primitive of the one or more modification primitives. The operations include modifying the base animation to generate a modified animation, including applying the one or more motion modifiers to the base animation, wherein each of the one or more modification primitives of each motion modifier modifies the respective animation curve based on at least one of the one or more respective parameters of the motion modifier.

Some implementations may include a system that includes a processor and a memory coupled to the processor. The memory may have instructions stored thereon that, when executed by the processor, cause the processor to perform operations that include one or more of the features of the methods described above. Some implementations may include a computer-implemented method that includes one or more of the operations performed by a processor of a system described above. Some implementations include a non-transitory computer-readable medium with instructions stored thereon that, when executed by a processor, cause the processor to perform operations that can be the same or similar to features of the methods and/or systems described above.

DETAILED DESCRIPTION

Figure 1:
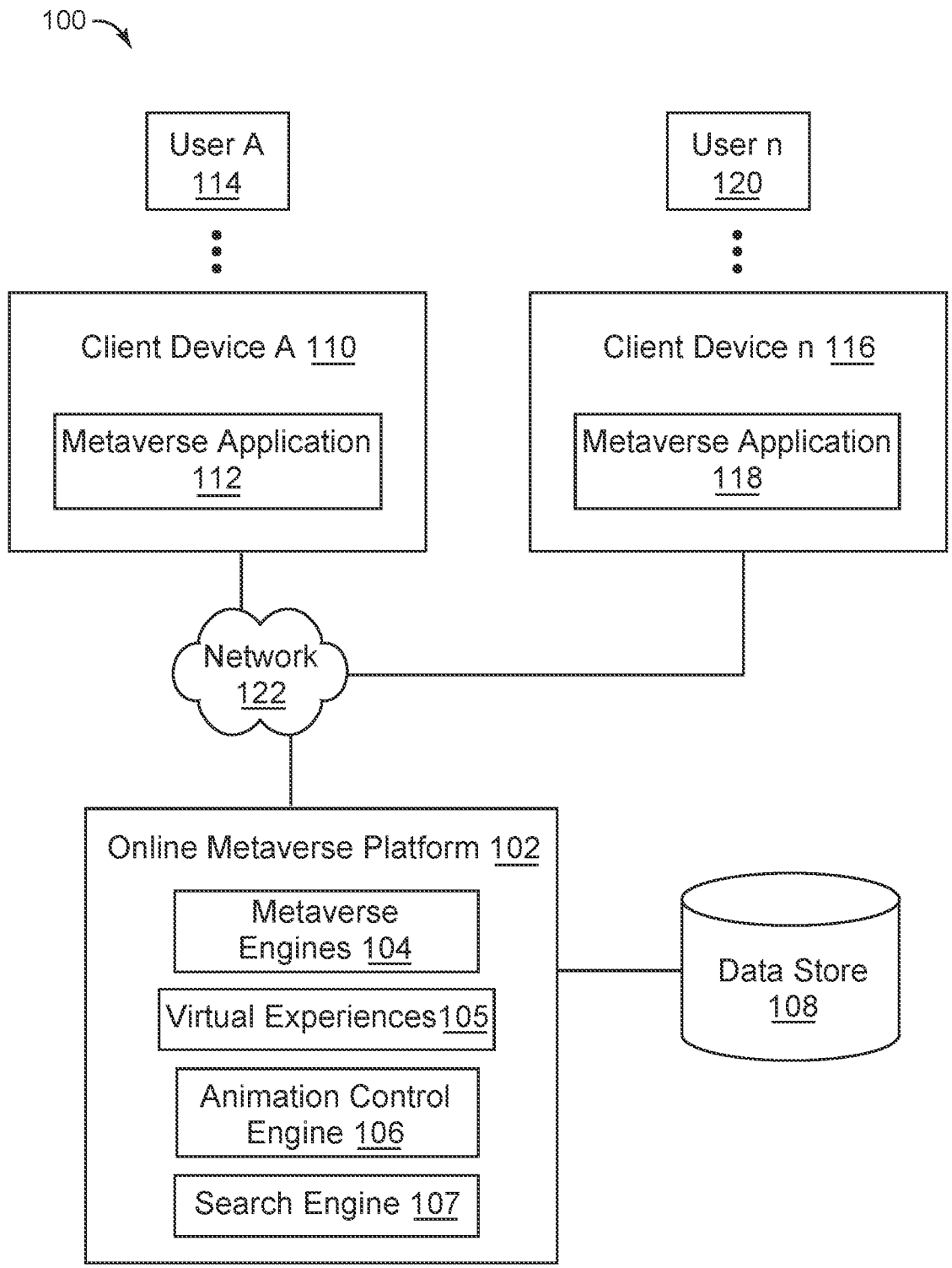
FIG. 1 is a diagram of an example system architecture, in accordance with some implementations.

One or more implementations described herein relate to generation of avatar animations for virtual environments using motion modifiers. A computer-implemented method includes selecting or otherwise determining one or more motion modifiers to modify a base animation of an avatar. Each motion modifier includes one or more modification primitives that are configured to modify animation data, such as animation curves, of the base animation that are associated with movement of particular portions (such as body parts) of the avatar. Parameters for the motion modifiers are determined and the motion modifiers are applied to the base animation to modify the animation data based on the parameters. The modified animation can, for example, be applied to the avatar in a virtual environment to cause the avatar to move according to the modified animation.

Various features include modification primitives that modify position values of the associated portion of the avatar, a timing of motion in the base animation, and/or a frequency of motion of a portion of the avatar in the base animation. The base animation can be an existing (e.g., stored) animation, or can be a newly-generated animation. The base animation can be streaming animation data received by a device such that modification of the base animation is performed in real-time, e.g., to modify an animation of an avatar being displayed in a virtual experience. Parameters for the motion modifiers can be determined by a user or can be automatically determined, without user input. One or more parameters can be determined as a function of an attribute of motion of the avatar in the base animation (e.g., velocity, position, etc.); for example, the attribute can be based on statistical motion data (e.g., mean or average velocity, position, etc.) for an associated body part of the avatar in the base animation.

Motion modifiers can be selected for modifying the base animation based on a current state of the avatar in the virtual environment (e.g., an emotion to be expressed by the avatar), and/or based on one or more current states of the virtual environment. Higher level motion modifiers can be used, which can apply multiple lower level motion modifiers that each apply one or more modification primitives. Motion modifiers can modify motion of body parts of the avatar, such as arms, torso, head, legs, etc., to express a style or an emotion via the motion in the animation. Two or more animations (e.g., the base animation and modified animation) can be blended, and the amount of blend can vary during the animation, e.g., gradually or otherwise.

Features described herein provide improved and computationally efficient modification and generation of animations of avatars. The use of motion modifiers as defined transformations of avatar motion can be applied to an animation to synthesize variations in avatar motion without changing the underlying structure or intent of the motion in the animation. Described motion modifiers can operate on different types of animations, operate on static animation clips and streaming animations (e.g., runtime motion synthesis), can be combined to create increasingly complex modifications, and can allow users to define the extent to which the motion modification is applied to an animation.

The described motion modifiers change a style of an animation by using one or more modification primitives which can operate on the entire avatar or specific portions of an avatar such as body parts. The motion modifiers can provide flexible, fine-tuned, and customizable modifications via, for example, modification primitives that include position value scale and position offsets, timing modifiers, and frequency modifiers (e.g., motion filters). These primitives can be combined and customized to create complex motions that can map to high-level styles (e.g., robotic, western, etc.), emotions or moods (e.g., angry, happy, energetic, etc.), and/or personalities (e.g., proud, arrogant, welcoming, etc.) which can be easily customized by users. Developers can easily alter a default movement style of an avatar animation to suit a different style of a particular experience (e.g., a Western theme, a cyberpunk experience, etc.) and do not have to create, store, and organize individual animations for every desired style, emotion, etc.

The described motion modifiers can serve as building blocks to create animations that are customizable and extensible. For example, increasingly complex modifications can be created by combining and layering simpler, lower-level motion modifiers on an animation in a hierarchical and modular manner. Complex modifiers can be integrated into an animation control framework to support general runtime modification of avatar motion. Parameter(s) of motion modifiers can be specified to achieve a desired motion effect, and/or can be determined automatically by a system from animation motion attributes derived from statistical motion data.

Described motion modifiers can be generalized across different animation motions and avatars (rigs). In some implementations, animations can be generated that have widely differing dynamics by conditioning applied motion transformations on physical attributes of avatar motion such as speed, acceleration, kinetic energy, etc. For example, it may be inefficient to create and store a specific motion modifier for every animation of an avatar. Motion modifiers can be generalized by defining their motion transformations as a function of one or more of these attributes of an animation (e.g., an animation clip or streaming animation data). For example, the motion can be determined from statistical data (e.g., a mean, minimum/maximum, etc.) derived from the motion of the animation. The statistical data can be utilized for run-time modification of animations. Motion modifiers can also be used as motion generators to generate new animations which do not require a base animation. This can mitigate the need for animation data on a metaverse platform and increase the movement capabilities of avatars.

Described features provide several technical advantages over previous techniques for using, generating, and modifying avatar animations. Described features provide technical advantages that enable reduction of use of computational resources (e.g., computer memory, processor use and time, networking traffic bandwidth, etc.) in various described implementations. For example, described techniques can store, transmit, and process reduced amounts of data compared to previous techniques that may require significant storage, network bandwidth, and processing resources to store, transmit, and process animation data. For example, described techniques can store motion modifiers that can modify a base animation in a variety of ways to obtain a large variety of different avatar animations, without having to independently and separately create and store each of those animations. Such motion modifiers occupy a much smaller amount of storage space than individual animations. Furthermore, some modifications of described techniques can be generalized for use on different animations and/or different avatars, thus reducing the number of separate animations and/or motion modifiers that need to be stored, transmitted, and processed for different animation sequences and different avatars. In addition, described motion modifiers can be used to generate animations, e.g., in real-time, thus requiring less storage, network, and processing resources to store numerous animations. Furthermore, automatic determination of motion modifiers and/or parameters for such modifiers can reduce processing resources (e.g., used by user interface tools, editing software, backup storage, etc.) required for users to manually create, store, and process animations.

FIG. 1 illustrates an example system architecture 100, in accordance with some implementations of the disclosure. System architecture 100 is provided for illustration. In some implementations, the system architecture 100 may include the same, fewer, more, or different elements configured in the same or different manner as that shown in FIG. 1. System architecture 100 (also referred to as "system" herein) includes an online metaverse platform 102, a first client device 110 (generally referred to as "client devices 110/116" herein), a network 122, and a second client device 116. The online metaverse platform 102 can include, among other things, a metaverse engine 104, one or more virtual experiences 105, an animation control engine 106, a search engine 107, and a data store 108. The client device 110 can include a metaverse application 112. The client system 116 can include a metaverse application 118. Users 114 and 120 can use client devices 110 and 116, respectively, to interact with the online metaverse platform 102.

The term "virtual experience" or "game," as used herein, refers to any virtual experience in a computer (virtual) environment, including games with specified objectives or end states, as well as other types of games or virtual experiences provided for user(s) in a virtual environment such as training, tourism, activity simulation, concerts, meetings, virtual gatherings, etc. that may not have a specific objective or end state. The virtual experience may include one or more avatars (e.g., character models). An avatar is a virtual object that may be controlled by a human user, or may be a computer-generated avatar (e.g., a non-player character controlled by a game or other virtual experience). In various implementations, an avatar may be a humanoid, an animal form, a vehicle form, an object form, or in any other form. In some implementations, the avatar may include a mesh (a set of points arranged in 3D space to obtain an avatar with body parts such as head, torso, limbs, etc.). Further, in some implementations, one or more textures may be attached to a mesh. A texture may define various visual appearances, such as avatar skin parameters, clothing, etc., and can include color, reflectivity, shape, etc. In various implementations, avatar animation may be performed automatically by metaverse engine 104 and/or by metaverse applications (112, 118).

A metaverse platform, as described herein, may include any platform that provides one or more virtual experiences in a virtual environment or metaverse. A metaverse application, as described herein, may include any application that enables a user to participate in a virtual experience (e.g., game, etc.), and engage in virtual activity or gameplay, including configuring an avatar, moving about in 3D space (of a virtual environment), performing actions, engaging with other avatars, interacting with other users via text/audio/video chat, etc.

Online metaverse platform 102 (also referred to as "user-generated content platform" or "user-generated content system") can offer a variety of ways for users to interact with one another. For example, users of an online metaverse platform may play games or other virtual experiences that are provided by the platform, e.g., games that include player-controlled characters (avatars), non-player characters (avatars), and other virtual objects and mechanisms. Some online metaverse platforms can provide a variety of different environments (e.g., two dimensional or virtual three-dimensional environments) in which users can play in online virtual experiences. In some implementations, users of an online metaverse platform may create games, environments, or other content or resources (e.g., avatars, other objects, graphics, items for game play within a virtual environment, etc.) within the metaverse platform. Users of an online metaverse platform may work together towards a common goal in a game or in game creation, share various virtual metaverse items, send electronic messages to one another, and so forth. An online metaverse platform may also allow users of the platform to communicate with each other, e.g., using voice messages (e.g., via audio voice chat), text messaging, video messaging, or a combination of the above.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In one implementation, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online metaverse platform 102 can include a server having one or more computing devices (e.g., a cloud computing system, a rackmount server, a server computer, cluster of physical servers, virtual server, etc.). In some implementations, a server may be included in the online metaverse platform 102, be an independent system, or be part of another system or platform.

In some implementations, the online metaverse platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online metaverse platform 102 and to provide a user with access to online metaverse platform 102. The online metaverse platform 102 may also include a website (e.g., one or more webpages) or application back-end software that may be used to provide a user with access to content provided by online metaverse platform 102. For example, users may access online metaverse platform 102 using the metaverse application 112/118 on client devices 110/116, respectively.

In some implementations, online metaverse platform 102 may be a type of social network providing connections between users or a type of user-generated content system that allows users (e.g., end-users or consumers) to communicate with other users via the online metaverse platform 102, where the communication may include voice chat, video chat, or text chat. In some implementations of the disclosure, a "user" may be represented as a single individual person. However, other implementations of the disclosure encompass a "user" (e.g., creating user) being an entity controlled by a set of users or an automated source. For example, a set of individual users federated as a community or group in a user-generated content system may be considered a "user." In some implementations, a "user" can include one or more programs or virtual entities, as well as persons that interface with the system or network.

In some implementations, online metaverse platform 102 may include a virtual gaming platform. For example, the gaming platform may provide single-player or multiplayer games (and other virtual environments) to a community of users that may access or interact with games (e.g., user generated games or other games) using client devices 110/116 via network 122. In some implementations, games (also referred to as "video game," "online game," or "virtual game" herein) may be two-dimensional (2D) games, three-dimensional (3D) games (e.g., 3D user-generated games), virtual reality (VR) games or environments, or augmented reality (AR) games, for example. In some implementations, games can include environments which may not have game goals, e.g., simulators of particular actions or environments which a player can explore and/or interact with. In some implementations, users may search for games and participate in gameplay with other users in one or more games selected from results of the search. In some implementations, a game selected from results of the search may be played in real-time with other users of the game. In some implementations, gameplay may refer to interaction of one or more players using client devices (e.g., 110 and/or 116) within a virtual experience (e.g., 105) or the presentation of the interaction on a display or other output device of a client device 110 or 116.

In some implementations, other platforms can be used with the techniques described herein instead of or in addition to online metaverse platform 102. For example, a social networking platform, purchasing platform, messaging platform, creation platform, etc. can be used to provide animation modification, generation, and usage features based thereon.

One or more virtual experiences 105 are provided by the online metaverse platform. In some implementations, a virtual experience 105 can include an electronic file that can be executed or loaded using software, firmware or hardware configured to present the virtual experience content (e.g., digital media item) to an entity. In some implementations, a metaverse application 112/118 of a virtual experience may be executed and one or more virtual experience instances can be rendered in connection with a virtual experience 105 and metaverse engine 104. In some implementations, a virtual experience 105 may have a common set of rules and/or common goal, and the environments of a virtual experience share the common set of rules and/or common goal. In some implementations, different virtual experiences 105 may have different rules or goals from one another.

In some implementations, virtual experiences 105 may have one or more environments (also referred to as "virtual environments," "computer environments," or "gaming environments" herein) where multiple environments may be linked. An example of an environment may be a three-dimensional (3D) environment. The one or more environments of a game may be collectively referred to a "world" or "gaming world" or "virtual world" or "universe" herein. An example of a world may be a 3D world of a game. For example, a user may build a virtual environment that is linked to another virtual environment created by another user. An avatar in the virtual game may cross the virtual border of one virtual environment to enter an adjacent virtual environment.

It may be noted that 3D environments or 3D worlds use graphics that use a three-dimensional representation of geometric data representative of virtual experience content (or at least present such content to appear as 3D content whether or not 3D representation of geometric data is used). 2D environments or 2D worlds use graphics that use two-dimensional representation of geometric data representative of virtual experience content.

In some implementations, the online metaverse platform 102 can host one or more virtual experiences 105 and can permit users to interact with the virtual experiences 105 (e.g., create, modify, search for, request, and/or join a virtual experience 105, virtual experience instances of virtual experience 105, virtual experience-related content, or other content) using a metaverse application 112/118 of client devices 110/116. Users (e.g., 114 and/or 120) of the online metaverse platform 102 may play, create, interact with, or build virtual experiences 105, search for virtual experiences 105, communicate with other users, create and build objects (e.g., also referred to as "item(s)" or "virtual experience objects" or "virtual experience item(s)" herein) of virtual experiences 105, and/or select or search for objects. For example, when generating user-generated virtual items, users may create avatars, attributes, actions, or animations for the created avatars, decoration for the avatars, one or more virtual environments for an interactive virtual experience, or build structures used in a virtual experience, among others. In some implementations, users may buy, sell, or trade virtual experience objects, such as in-platform currency (e.g., virtual currency), with other users of the online metaverse platform 102. In some implementations, online metaverse platform 102 may transmit virtual experience content to metaverse applications (e.g., 112). In some implementations, virtual experience content (also referred to as "content" herein) may refer to any data or software instructions (e.g., virtual experience objects, virtual environment and features therein, virtual experience, user information, video, images, commands, media item, etc.) associated with online metaverse platform 102 or metaverse applications. In some implementations, virtual experience objects (e.g., also referred to as "item(s)," "objects," "virtual objects," or "virtual experience item(s)" herein) may refer to objects that are used, created, shared or otherwise depicted in virtual experiences 105 of the online metaverse platform 102 or metaverse applications 112 or 118 of the client devices 110/116. For example, virtual experience objects may include a part, model, avatar, tools, weapons, clothing, buildings, vehicles, currency, flora, fauna, components of the aforementioned (e.g., windows of a building), and so forth.

In some implementations, a user can create or modify a computer model that is a virtual experience object, such as an avatar used in one or more virtual experiences. For example, the user can create or modify a skeleton (e.g., rig), shape, surface texture and color, and/or other attributes of an avatar. In some examples, an avatar can be similar to a human body model, e.g., can have any of a head, torso/abdomen, arms, legs, hands, feet, joints, etc. and can move similarly to a human body (e.g., walk, run, jump, turn head, move arms, etc.). In some cases, the avatar can have fewer joints than a human body, and in other cases, the avatar can have all joints or more joints than a human body.

In some implementations, an avatar can be animated by a user, e.g., instructed to move within a computer generated environment according to a particular sequence of moves. For example, instructions can be provided to move one or more parts of the avatar (e.g., parts corresponding to limbs or body parts of a humanoid avatar) to one or more different poses, each pose providing particular joint angles for joints of the avatar. The instructions to move the model can be provided from a user in an editor interface, e.g., the user commanding the movement via input in the interface. In some cases, the instructions can be provided from storage and can include a sequence of poses for the avatar.

It may be noted that the online metaverse platform 102 is provided for purposes of illustration, rather than limitation.

In some implementations, a virtual experience 105 may be associated with a particular user or a particular group of users (e.g., a private virtual experience), or made widely available to users of the online metaverse platform 102 (e.g., a public virtual experience). In some implementations, where online metaverse platform 102 associates one or more virtual experiences 105 with a specific user or group of users, online metaverse platform 102 may associate the specific user(s) with a virtual experience 105 using user account information (e.g., a user account identifier such as username and password).

In some implementations, online metaverse platform 102 or client devices 110/116 may include metaverse engines 104 or metaverse application 112/118. In some implementations, metaverse engines 104 can include a metaverse application similar to metaverse application 112/118. In some implementations, metaverse engines 104 may be used for the development and/or execution of virtual experiences 105. For example, metaverse engines 104 may include a rendering engine ("renderer") for 2D, 3D, VR, or AR graphics, a physics engine, a collision detection engine (and collision response), sound engine, scripting functionality, artificial intelligence engine, networking functionality, streaming functionality, memory management functionality, threading functionality, scene graph functionality, or video support for cinematics, among other features.

Metaverse platform 102 may also include an animation control engine 106 (also referred to as animation engine) that can interface with metaverse engines 104 and virtual experiences 105. Animation control engine 106 can access stored animations, create and modify animations, etc. for avatars and other objects, based on user input and other data (as well as determine poses for avatars in some implementations). Some example methods to generate and/or modify animations which can be implemented by animation engine 107 are described below with reference to FIG. 2. Animation data (e.g., animation curves) and other data (e.g., statistical motion data for avatar animations) can be stored and accessed in database 108 and/or other storage of platform 102. In some implementations, animation engine 106 can be implemented on a client device 110 and/or 116.

The components of the metaverse engines 104 may generate commands that help compute and render a virtual experience instance of a virtual experience 105 (e.g., rendering commands, collision commands, physics commands, etc.). In some implementations, metaverse applications 112/118 of client devices 110/116, respectively, may work independently, in collaboration with metaverse engine 104 of online metaverse platform 102, or a combination of both.

In some implementations, both the online metaverse platform 102 and client devices 110/116 execute a metaverse engine/application (104, 112, and 118, respectively). The online metaverse platform 102 using metaverse engine 104 may perform some or all the metaverse engine functions (e.g., generate physics commands, rendering commands, etc.), or offload some or all the metaverse engine functions to metaverse applications 112 and 118 of client devices 110 and 116, respectively. In some implementations, each virtual experience 105 may have a different ratio between the metaverse engine functions that are performed on the online metaverse platform 102 and the metaverse engine functions that are performed on the client devices 110 and 116. For example, a metaverse engine 104 of the online metaverse platform 102 may be used to generate physics commands in cases where there is a collision between at least two game objects, while the additional metaverse engine functionality (e.g., generate rendering commands) may be offloaded to the client device 110. In some implementations, the ratio of metaverse engine functions performed on the online metaverse platform 102 and client device 110 may be changed (e.g., dynamically) based on virtual environment or gameplay conditions. For example, if the number of users participating in gameplay of a virtual experience 105 exceeds a threshold number, the online metaverse platform 102 may perform one or more metaverse engine functions that were previously performed by the client devices 110 or 116.

For example, players may be participating in a virtual experience instance of virtual experience 105 on client devices 110 and 116, and may send control instructions (e.g., user inputs, such as directional inputs of right, left, up, down, avatar position and velocity information, text, voice input, etc.) to the online metaverse platform 102. Subsequent to receiving control instructions from the client devices 110 and 116, the online metaverse platform 102 may send instructions (e.g., position and velocity information of the avatars participating in the group gameplay or commands, such as rendering commands, collision commands, etc.) to the client devices 110 and 116 based on control instructions (e.g., including avatar and object animation data). For instance, the online metaverse platform 102 may perform one or more logical operations (e.g., using metaverse engine 104) on the control instructions to generate gameplay instruction for the client devices 110 and 116. In other instances, online metaverse platform 102 may pass one or more or the control instructions from one client device 110 to other client devices (e.g., 116) participating in the virtual experience instance. The client devices 110 and 116 may use the gameplay instructions and render the gameplay for presentation on the displays of client devices 110 and 116.

In some implementations, the control instructions may refer to instructions that are indicative of actions of a user-controlled avatar in a virtual environment. For example, control instructions may include user input to control the action, such as right, left, up, down, user selection, gyroscope position and orientation data, force sensor data, text, voice input, etc. The control instructions may include avatar position and velocity information. In some implementations, the control instructions are sent directly to the online metaverse platform 102. In other implementations, the control instructions may be sent from a client device 110 to another client device (e.g., 116), where the other client device generates control instructions using the local metaverse application 118. The control instructions may include instructions to play a voice communication message or other sounds from another user on an audio device (e.g., speakers, headphones, etc.).

In some implementations, control instructions may refer to instructions that allow a client device 110 (or 116) to render play experience of a virtual experience in a virtual experience instance. The control instructions may include one or more of user input, avatar position and velocity information, or commands (e.g., physics commands, rendering commands, collision commands, etc.).

In some implementations, the control instructions can cause an animation associated with a virtual object, such as an avatar, to be displayed in the virtual experience. For example, control instructions can include a direct command to play an animation that causes the avatar to move (e.g., walk, jump, swing arms, dance, etc.). In some examples, control instructions that move an avatar may cause an animation of the avatar to commence based on interactions of the avatar with the virtual environment. For example, the avatar being moved off a ledge can cause a falling animation to be played for the avatar.

In some implementations, virtual objects (e.g., avatars, characters, other objects) are constructed from components, one or more of which may be selected by the user, that automatically join together to aid the user in editing. One or more avatars (also referred to as a "character," or "character model" herein) may be associated with a user where the user may control the avatar when playing a virtual experience 105 to facilitate the player's interaction with the virtual experience 105. In some implementations, an avatar may include components such as body parts (e.g., hair, arms, legs, etc.) and accessories (e.g., t-shirt, glasses, decorative images, tools, etc.). In some implementations, body parts of avatars that are customizable by a player include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools. In some implementations, a player may control the scale (e.g., height, width, or depth) of an avatar or the scale of components of an avatar. In some implementations, the player may control the proportions of an avatar (e.g., blocky, anatomical, etc.).

In some implementations, a component, such as a body part, may be a primitive geometrical shape such as a block, a cylinder, a sphere, etc., or some other primitive shape such as a wedge, a torus, a tube, a channel, etc. In some implementations, a creation and editing module and interface of metaverse application 112/118 (or virtual experience engines 104) may publish a user's avatar for view or use by other users of the online metaverse platform 102. In some implementations, creating, modifying, or customizing avatars, other virtual experience objects, virtual experiences 105, or virtual environments may be performed by a user using a user interface (e.g., developer interface) and with or without scripting (or with or without an application programming interface (API)). For example, a developer interface can be displayed by a client device 110 and the user at the client device can select user interface commands to create and/or modify objects (including avatars), environments, and scripts for a virtual experience. It may be noted that for purposes of illustration, rather than limitation, avatars are described as having a humanoid form. It may further be noted that avatars may have any form such as a vehicle, animal, inanimate object, or other form.

In some implementations, the online metaverse platform 102 may store avatars (e.g., characters) created by users in the data store 108. In some implementations, the online metaverse platform 102 maintains an avatar catalog and virtual experience catalog that may be presented to users via a user interface. In some implementations, the virtual experience catalog includes images of virtual experiences stored on the online metaverse platform 102. In addition, a user may select an avatar (e.g., an avatar created by the user or other user) from the avatar catalog to participate in the chosen virtual experience. The avatar catalog includes images of avatars stored on the online metaverse platform 102. In some implementations, one or more of the avatars in the avatar catalog may have been created or customized by the user, and/or created or customized by other users. In some implementations, the chosen avatar may have avatar settings defining one or more of the components of the avatar. In some implementations, some avatars or portions of avatars (and/or data associated with the avatars) can be stored locally to client devices 110/116.

In some implementations, a user's avatar can include a configuration of components, where the configuration and appearance of components and more generally the appearance of the avatar may be defined by avatar settings. In some implementations, the avatar settings of a user's avatar may at least in part be chosen by the user. In other implementations, a user may choose an avatar with default avatar settings or avatar setting chosen by other users. For example, a user may choose a default avatar from an avatar catalog that has predefined avatar settings, and the user may further customize the default avatar by changing some of the avatar settings (e.g., adding a shirt with a customized logo). The avatar settings may be associated with a particular avatar by the online metaverse platform 102.

Avatar settings can also include one or more animations associated with an avatar. An animation, when played, causes the avatar to move within the environment and/or move particular body parts or other physical features of the avatar. An animation includes a sequence of multiple poses which the avatar assumes in a virtual environment to cause the avatar to move or be otherwise changed in physical (displayed) appearance. For example, some animations can cause the avatar to have a particular facial expression (e.g., smile, frown, yell, laugh, etc.). Some animations can cause the one or more of the avatar's body components to move in a particular manner, e.g., to cause the avatar to nod or otherwise move its head, to walk, run, dive to the ground, jump, stagger, hop, roll on the ground, somersault, perform exercises, shake the head from side to side, shrug shoulders, etc. An avatar can be associated with multiple animations, and one or more of the animations can be designated by a user (e.g., using a developer interface of metaverse application 112/118 or metaverse engines 104) to trigger and be played based on respective particular condition(s). Some animations can be designated to play for the avatar in response to a user command during the virtual experience, such as an action to move the avatar in the virtual environment, act on a different object in the virtual environment, a specific command to play the particular animation, etc. According to features described herein, statistical motion data can also be stored in database 108, and associated with the avatar animations to which it applies. In some implementations, one or more motion modifiers and/or parameter sets for such modifiers can be stored in database 108.

Animation engine 106, using one or more features described herein, can process animations for use by avatars provided in virtual environments of the metaverse platform. According to features described herein, an animation can be generated or edited by creating or selecting one or more motion modifiers and applying the motion modifiers to an animation. The animation engine 106 can provide a generated animation to the user as an option to be applied to a specified avatar in virtual experiences in which the user created or participates. For example, the generated animation can be made available to user(s) as an option in an editing interface (or the user's account on the metaverse platform). In some implementations, a user can select the generated animation to be applied to an avatar and can specify the animation to trigger in response to particular conditions in a virtual environment.

In some implementations, online metaverse platform 102 may include a search engine 107. In some implementations, the search engine 107 may be a system, application, or module that permits the online metaverse platform 102 to provide search functionality to users, where the search functionality permits the users to search virtual experiences 105 that are available, the most popular virtual experiences, virtual experience instances that are looking for players, virtual experience assets available on the metaverse platform 102, etc. In some implementations, search engine 107 can provide search functionality for motion modifiers, sets of parameters for such modifiers (e.g., that provide a particular style or effect of an animation when input to particular motion modifiers), and/or statistical motion data as described herein that are available for selection and use, e.g., allowing presentation of categories of styles of motion modifiers, emotions or moods associated with motion modifiers, and other categories of motion modifiers from which a user can browse and select.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." In some implementations, one or more client devices 110 or 116 may connect to the online metaverse platform 102 at any given moment. It may be noted that the number of client devices 110 or 116 is provided as illustration, rather than limitation. In some implementations, any number of client devices 110 or 116 may be used.

In some implementations, each client device 110 or 116 may include an instance of the metaverse application 112 or 118, respectively. In one implementation, the metaverse application 112 or 118 may permit users to use and interact with online metaverse platform 102, such as search for a virtual experience or other content, control a virtual avatar in a virtual experience hosted by online metaverse platform 102, or view or create or upload content, such as virtual experiences 105, images, avatars, and other objects, model animations, videos, web pages, documents, and so forth. In one example, the metaverse application may be a web application (e.g., an application that operates in conjunction with a web browser) that can access, retrieve, present, or navigate content (e.g., virtual avatar in a virtual environment, etc.) served by a web server. In another example, the metaverse application may be a native application (e.g., a mobile application, app, or a gaming program) that is installed and executes local to client device 110 or 116 and allows users to interact with online metaverse platform 102. The metaverse application may render, display, or present the content (e.g., a web page, a media viewer) to a user. In an implementation, the metaverse application may also include an embedded media player (e.g., a Flash® player) that is embedded in a web page.

According to aspects of the disclosure, the metaverse application 112/118 may be an online metaverse platform application for users to build, create, edit, upload content to the online metaverse platform 102 as well as interact with online metaverse platform 102 (e.g., play virtual experiences 105 hosted by online metaverse platform 102). As such, the metaverse application 112/118 may be provided to the client device 110 or 116 by the online metaverse platform 102. In another example, the metaverse application 112/118 may be an application that is downloaded from a server.

In some implementations, a user may login to online metaverse platform 102 via the metaverse application. The user may access a user account by providing user account information (e.g., username and password) where the user account is associated with one or more avatars available to participate in one or more virtual experiences 105 of online metaverse platform 102.

In general, functions described in one implementation as being performed by the online metaverse platform 102 can also be performed by the client device(s) 110 or 116, or a server, in other implementations if appropriate. In addition, the functionality attributed to a particular component can be performed by different or multiple components operating together. The online metaverse platform 102 can also be accessed as a service provided to other systems or devices through appropriate application programming interfaces (APIs), and thus is not limited to use in websites.

Figure 2:
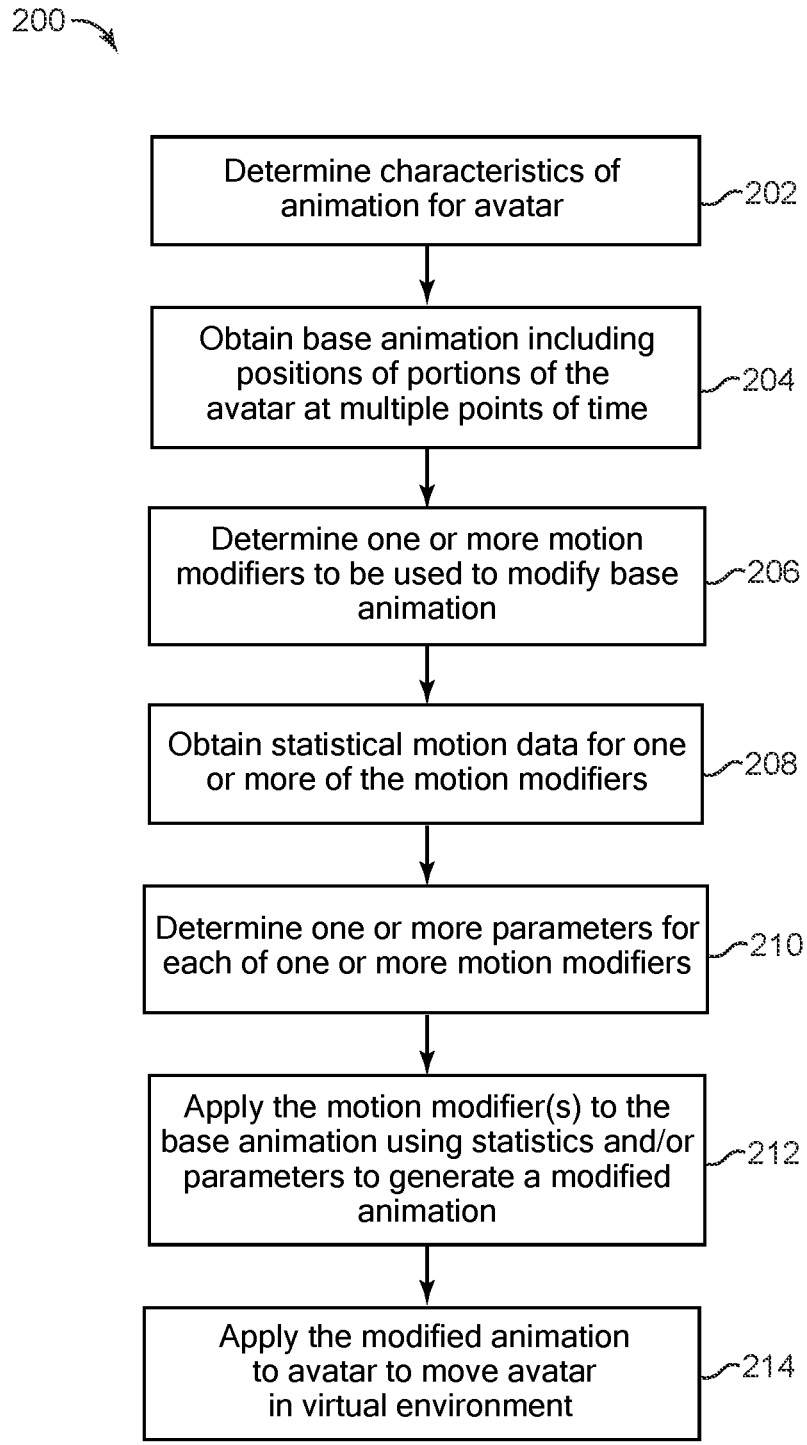
FIG. 2 is a block diagram of an example method to generate and apply avatar animations for virtual environments using motion modifiers, in accordance with some implementations.

FIG. 2 is a block diagram illustrating an example method 200 to generate and apply avatar animations for virtual environments using motion modifiers, in accordance with some implementations. In some implementations, method 200 can be implemented, for example, on a server system, e.g., online metaverse platform 102 as shown in FIG. 1. In some implementations, method 200 can be performed by metaverse engine(s) 104 and animation engine 107 of online metaverse platform 102. In some implementations, some or all of the method 200 can be implemented on a system such as one or more client devices 110 and 116 as shown in FIG. 1, and/or on both a server system and one or more client systems. In described examples, the implementing system includes one or more processors or processing circuitry, and one or more storage devices such as a database, data structure, or other accessible storage. In some implementations, different components of one or more servers and/or clients can perform different blocks or other parts of the method 200. Method 200 may begin at block 202.

In block 202, characteristics of an animation for an avatar are determined (the animation not yet generated). For example, this can be an animation that is to be applied to the avatar to cause it to move according to or based on animation data of the animation, or can be an animation that is to be added to a database (e.g., database 108).

In some implementations, the avatar can be an object (e.g., a character model) provided in a virtual environment, e.g., a game environment or other virtual environment. For example, the avatar can appear as a 3D model in a 3D virtual environment, or appear as a 2D model, bitmap, or sprite in a 2D virtual environment, representing a person, animal, vehicle, object or article, etc., that includes visual textures including pixels providing a visual appearance. In some examples, the avatar represents and is controlled by a user, e.g., a user or player in a game or other virtual experience, so that the user can, e.g., cause the avatar to move by inputting directional commands to the virtual experience, to perform actions by inputting other commands to the virtual experience, etc. In further examples, the avatar may not be controlled by any human user, e.g., may be a non-player character or other object in a game or other virtual experience.

The animation is a set of data describing one or more motions (also referred to as movements) of the avatar in the virtual environment performed over time. In some implementations, the characteristics of the animation for the avatar can be specified by a user, e.g., a developer that is adding the animation to the avatar for a game or other virtual experience.

In some implementations, the characteristics of the animation can be automatically determined (without user input) by a system that is implementing the virtual environment (e.g., online metaverse platform 102 or a client device 110 or 116). For example, the animation can be determined in real-time and during runtime of a game or other virtual experience, e.g., the animation is determined and applied during execution of the virtual experience and as one or more users are experiencing the virtual experience. The characteristics of the animation can be based on, for example, what a next state of the avatar and/or virtual environment will be, that is in turn based on, for example, one or more previous states of the avatar, a user controlling the avatar, and/or the virtual environment in which the avatar is located. For example, such states can include a mood or emotion of the avatar as determined by virtual experience engine or software, e.g., based on user input, a previous event occurring in the virtual environment (e.g., encountering a particular character or object), and/or other factors. In some implementations, such states can include an emotion or mood of the controlling user (with user consent), e.g., determined based on user input to the virtual experience (e.g., text or images) and/or based on user characteristics sensed with a sensor device, such as user facial expression in a captured image, heartbeat rate, etc. (with consent by the user).

The animation characteristics determined by the system can include characteristics such as a style, emotion, mood, or personality associated with an avatar. For example, game software instructions may indicate that the avatar is to walk in a happy and energetic style, in response to a location of the virtual environment that the avatar has moved into. In such a case, characteristics determined by the system for the animation can include "happy emotion" and "energetic emotion."

In some implementations, one or more avatar states and properties and/or animation properties of the avatar (or a previous animation of the avatar) can be detected and recognized using machine learning models trained to detect particular avatar poses, motions, image features, etc., and/or using rules-based expert systems that can detect avatar and/or animation properties. Block 202 may be followed by block 204.

In block 204, a base animation (e.g., original animation) is obtained. The base animation can be generated as a new animation in this block 204, or can be an animation that was previously generated and stored and is selected and retrieved from storage in block 204.

The base animation includes animation data that describes positions of one or more portions of an avatar at different points in time. For example, the animation data can indicate positions of one or more portions of the avatar in a virtual environment. For example, the animation data can include animation curves that each represent one dimension of motion of the associated avatar portion. Three animation curves can thus describe movement of the avatar portion in three dimensions. For example, the avatar portion can be a body part or can be any portion of the avatar (in some implementations, the avatar portion can be the entire avatar). In some examples, the animation curve can be represented in a graph having a vertical axis of position and a horizontal axis of time, where positions of the body part are indicated (as position values) over time with reference to an origin position of the body part. In some examples, an animation curve can show the position of an avatar forearm body part as an orientation or angle with reference to an origin angle, at multiple points in time to provide movement of that forearm over an indicated time period.

In some implementations, an animation curve can be represented as a number of keyframes at particular points of time along the time axis, and values between the keyframes are interpolated automatically. In other examples, an animation curve can be represented as an equation that describes the animation curve.

In some cases or implementations, the base animation can be generated as a new animation. For example, the base animation can be generated based on input from a user (e.g., developer) or based on instructions or software executing on a system (e.g., online metaverse platform 102 or client device 110 or 116). In some examples, the base animation can be generated by providing generic (e.g., blank or default) animation curves, e.g., that have no values or values of zero (or default values), for each body part of the avatar that is to be moved, and then modifying those generic animation curves to obtain the base animation. In some implementations, particular body parts of the avatar are assigned animation curves according to predefined definitions of types of animations (e.g., a walk, a run, a jump, etc.) for which particular body parts are to be moved. In some implementations, the generic animation curves can include position magnitudes over a time axis as defined by the definition of the type of animation, and/or the position magnitudes can be set by a user or by the implementing system, e.g., according to the definition.

In some implementations, the base animation is the animation that is currently or being played for the avatar in a virtual experience that is currently executing on a system, or was previously played in the current virtual experience. For example, the avatar may be currently walking with a default, neutral-style walk based on a currently-playing walk animation, and this walk animation can be obtained as the base animation in block 204. Block 204 may be followed by block 206.

In block 206, one or more motion modifiers are determined that are to be used to modify the base animation obtained in block 204. Each motion modifier includes one or more modification primitives that are associated with a portion of the avatar. The one or more motion modifiers can be determined such that an animation can be generated for the avatar that has the characteristics determined in block 202.

In some implementations where an animation is generated for an avatar being displayed at run-time, each motion modifier can be specified (e.g., previously designated) to be active and applicable only in particular current avatar states, such that if those avatar states are detected to be active (e.g., based on instructions provided by the virtual experience), the motion modifier is to be applied to the base animation of the avatar (as described below in block 212), and otherwise the motion modifier is not applied to the base animation. For example, a particular motion modifier may be restricted to be applied to avatars that are currently in a particular emotional state (e.g., a happy state).

Motion modifiers are discrete modification units that can modify an animation to obtain particular motion effects by the avatar. Such effects can be low level (e.g., move legs) or high level (e.g., happy walk). For example, some motion modifiers can be low level modifiers that modify an animation to obtain a motion effect that is single motion of a single portion of an avatar, such as rotation of a single body part about a joint. Some motion modifiers can be high level modifiers that modify an animation to obtain a motion effect that includes multiple motions (e.g., motions of multiple portions of the avatar) and/or a motion effect that expresses a particular style, emotion, mood, or personality of the avatar, such as a sad walk that moves the avatar in such a way to convey that the avatar has a sad emotion (e.g., slow movements, smaller bounce in the walk, hunched torso and drooping head, etc.).

A motion modifier includes one or more modification primitives, which can be a lowest level of modification to the base animation. Modification primitives can operate on a portion of an avatar, such as a single body part of an avatar, or can operate on one or more joints and/or body parts and/or the entire avatar. In some implementations, a modification primitive can be associated with a particular portion of the avatar, such as an arm body part about an arm joint (e.g., a forearm and hand rotating about an arm elbow joint), a head, a torso portion, etc.

In some implementations, modification primitives can be used to modify characteristics of an animation such as position of an avatar portion in the virtual environment, a timing of the motion of the avatar portion, and/or frequency of motion of the avatar portion in the animation.

Position modification primitives modify positions of particular portions of an avatar, e.g., relative to the base animation. For example, position modification primitives are transformations applied to one or more position values of an animation curve of the base animation. In some implementations, a position modification primitive can be a position value scale modifier or a position offset modifier. A position value scale modifier scales a position (e.g., a translational position or a rotational orientation) of a body part of the avatar that is specified in an animation curve, by an amount based on a magnitude of a scale parameter for the position value scale modifier. For example, if the base animation includes moving the avatar's hand 1 distance unit above its head, a position value scale modifier that has a magnitude of 2 can scale (e.g., multiply) this position to 2 distance units above its head. Or, if the motion moves the arm about an arm joint for an angle of 10 degrees from a reference angle position, the position value scale modifier having a magnitude of 2 can scale the rotational position of the arm to an angle that is 20 degrees from the reference angle position.

A position offset modifier can shift the positions of an entire animation curve by an amount based on a magnitude of an offset parameter of the offset modifier. For example, if the animation curve of the base animation moves the avatar hand 1 distance unit higher from an origin position at time 1, and 2 distance units higher from the origin at time 2, an offset modifier that has a magnitude of 1 can shift the animation curve 1 unit higher such that the hand moves 2 distance units higher from the origin at time 1, and 3 distance units higher from the origin at time 2. A position offset modifier can also provide an angular offset in which the entire animation curve is offset by an angular amount (e.g., about a joint) based on the offset magnitude.

Time modification primitives modify timing of the animation curves, e.g., the timing of motion of particular portions of an avatar relative to the base animation. A time scale modifier can be a modification primitive that is a transformation applied to the time axis of an animation curve to scale (e.g., modify such as increase or decrease) the duration of the base animation. For example, a parameter of 2 for a time scale modifier can increase the duration of the base animation by 2 time units (e.g., a time unit can be a second, a particular fraction of a second, etc.). In some implementations, modifying the time duration causes the animation curve to stretch or compress accordingly, e.g., so that the positions of the time curve occur at points of time that are proportionally the same relative to each other as in the base animation. In some implementations, a time scale modifier can specify one or more particular time periods of an animation curve to lengthen or compress, e.g., a time period between two specified points of time on the animation curve.

A time offset modifier can shift the timing of motion (e.g., position values) in an animation in the time duration of the animation. For example, an offset can delay the start of the motion of an associated portion of the avatar by a particular specified time period.

A frequency modifier can be a modification primitive that is a transformation applied in the frequency domain to a motion of the base animation, e.g., a modification of the frequency of the motion. For example, a frequency modifier can directly adjust the frequency of a motion of a body part of the avatar, such as moving legs forward and back in a walking animation. In some implementations, a frequency filter can be applied to an animation motion. For example, a high pass, bandpass, or low pass filter can be applied that removes particular bands or ranges of frequency from the motion. For example, a high pass filter can be applied to remove high-frequency jitter from a motion of the avatar.

In some implementations, a frequency analysis of an animation curve can be provided to generate a histogram of frequency bands indicating which frequencies are included in the animation curve. For example, the histogram can be included in the statistical motion data described below for block 208. The frequency modifier can apply modifications to the frequencies of the animation curve shown in the histogram frequency bands. The modification of frequency of motion can cause modifications to the positions and/or time axis of animation curves of the base animation in order to cause the change in frequency.

In some implementations, a frequency modifier such as a filter can be based on frequencies determined by evaluating the entire duration of the base animation. In some implementations, the base animation may not be fully accessible, e.g., if the base animation is being streamed and is being modified and displayed in real time as avatar data and animation data (e.g., keyframes) are being received by the system applying the animation modification. In some implementations, a history of received keyframes can be stored, and if future keyframes are needed to determine a frequency and/or apply a frequency filter, the last keyframe value can be repeated until sufficient keyframes are provided, and the repeated keyframes can be updated as the actual keyframes are received. Alternatively, application of the frequency modifier (e.g., filter) can be delayed until the sufficient keyframes are received.

The above any other motion modifiers (including modification primitives) described herein can be determined (e.g., selected) and applied to a base animation individually, or in any combination.

In some implementations, a high level motion modifier can be specified as a hierarchical structure or tree of one or more lower levels, each lower level including one or more lower-level motion modifiers. Some examples of a motion modifiers and hierarchical structures are described below with reference to FIGS. 3-6.

In some implementations, one or more of the motion modifiers may be created prior to the performance of method 200 and stored, and these motion modifiers can be retrieved from storage in block 206, e.g., from a database of motion modifiers. In some implementations, the available motion modifiers in the storage can be accessed according to particular categories in which the modifiers have been organized, such the type (e.g., walk, jump, etc.), style (e.g., thematic style such as pirate), emotion (e.g., sad or happy), or other category of animation provided by the modifiers.

In some implementations, at least one of the motion modifiers can be generated for use in method 200. For example, users (e.g., developers) can create one more motion modifiers by specifying one or more modification primitives for each of one or more particular portions (e.g., body parts) of an avatar. Parameters of those modification primitives can be determined for a particular application as described below. In some cases, the user can provide input to a system to generate one or more high level motion modifiers that are made up of one or more modification primitives, and to label and categorize the high level motion modifiers. In some implementations, the user can provide input to generate a motion modifier that references and is at a higher level than one or more modification primitives.

In some implementations, motion modifiers can be generated automatically (without user input) by a system, e.g., based on similar other motion modifiers, determination of poses and/or motions in the base animation, and/or the virtual environment. In some implementations, one or more of the motion modifiers can be generated in real-time during runtime of a virtual experience, e.g., by the system implementing the virtual experience or other connected system (e.g., metaverse platform 102 or client device 110 or 116). For example, new motion modifier(s) can be generated based on the base animation determined in block 204, a previous or current state of the avatar and/or the virtual environment, and/or other factors. In some cases, one or more generated motion modifiers can be high level modifiers composed of one or more stored modification primitives. In some examples, if it has been determined to generate an animation having sad and walking characteristics (e.g., as determined in block 202), then one or more modification primitives providing a "sad" motion for an avatar (or other sad-labeled motion modifiers) can be selected from storage to include in the generated motion modifier that is a sad walk motion modifier. In another example, if a virtual environment includes pools of waist-high water, and the avatar is determined to walk into such a pool, a motion modifier can be generated that includes modification primitives that slow the motion of the legs of the avatar when the avatar moves through the water. Block 206 may be followed by block 208.

In block 208, statistical motion data may be obtained for one or more motion modifiers. In some implementations, one or more of the motion modifiers determined in block 206 can use statistical motion data to determine parameters for the modifications to the base animation. For example, the statistical motion data can be based on one or more attributes of the motion of the avatar in the base animation, e.g., a range of motion, frequency or velocity of motion, etc.

In some examples, statistical motion data can indicate a center position (e.g., midpoint or pivot point) in a range of positions that are occupied by a particular body part of the avatar. The center position can be determined based on statistics of the motion of the base animation, e.g., a computed mean or average of the positions occupied by that body part in the animation duration. The mean position can be a mean translational position in of a translational range of the body part, or can be a mean orientation in a rotational range of the body part. This mean position provides a position, based on the base animation, from which modifications such as position value scale modifiers and position offset modifiers can be applied, e.g., to allow scaling or offset around a center of the motion of the body part.

In some examples, the statistical motion data can indicate a statistical range of motion of a body part in the base animation. For example, the mean or average range of motion can be determined based on how long the body part occupies each position in the range of motion, such that the statistical range of motion excludes body part positions that are outside a range of the most often occupied positions (e.g., outside a range occupied for a threshold percentage of the animation duration). In some implementations, a minimum and/or maximum of the range of motion can be provided in statistical motion data.

In some examples, statistical motion data can include a histogram of frequencies occurring in a motion of a body part in the base animation. For example, a frequency analysis of an animation curve can be provided to generate the histogram of frequency bands indicating which frequencies are included in the animation curve.

In some examples, the statistical motion data can indicate a statistical velocity (speed) of a body part of the avatar in the base animation. The statistical velocity can be a mean or average velocity of the body part. Similarly, the statistical motion data can indicate a statistical acceleration of a body part in the base animation (e.g., mean or average acceleration). In some examples, the statistical motion data can indicate a "kinetic energy" of a body part of the avatar in the base animation. The kinetic energy can be an indication of amount of activity of the body part over time. For example, kinetic energy can be based on mean or average velocity and an estimated mass of the body part (e.g., the mass approximated by size of the body part). For example, the kinetic energy can be based on the mass multiplied by the velocity squared. The statistical motion data can indicate a mean or average kinetic energy of the body part. In some implementations, the statistical motion data can include a minimum and/or maximum velocity, acceleration, and/or kinetic energy.

Such statistical motion data can be determined for one or more particular body parts of the avatar that are moved in the base animation. Statistical motion data can be determined in advance for stored base animations. In some cases, statistical motion data can be determined at runtime, e.g., at the time method 200 is performed, e.g., if the base animation is being streamed or newly accessed by the system performing method 200. In some implementations, only some of the motion modifiers may use statistical motion data in determining the modification to the base animation. Thus, statistical motion data may be determined and/or obtained in block 208 only for a subset of the body parts of the avatar that move in the base animation. This reduces the computation and processing needed to determine statistical data for an animation, if such statistical data is being determined at the time of performing method 200.

In some implementations, statistical motion data can be stored in association with a base animation and can be readily obtained for use by motion modifiers that modify the base animation. If the base animation is modified and stored as a new animation, statistical motion data can be recomputed for the motions of the new animation and stored in association with the new animation. Block 208 may be followed by block 210.

In block 210, one or more parameters are determined for each of one or more motion modifiers. The parameters determine the particular magnitude, duration or time scale length, frequency, and/or other characteristics of motion resulting from applying the motion modifiers to an animation. In some implementations, the parameters can be determined as part of block 206 when determining motion modifiers.

In various implementations or cases, parameters can be obtained as stored default parameters, or can be newly determined or generated. For example, a user (e.g., developer) can adjust the base animation to achieve a particular motion effect, by specifying one or more of the parameters. Existing default parameters for motion modifiers can also be adjusted.

Parameters can include magnitudes or other values that specify the amount of modification provided by a modification primitive as described above for block 206. For example, for a motion modifier that includes a position value scale modifier, the parameters can include the magnitude that is used to scale the specified motion of the base animation. The parameters can include a position offset parameter value for the position offset modifier, a time scale modification value (and/or time range specification) for the time scale modifier, and/or a frequency value for a frequency modifier that indicates a new frequency for the motion of the associated body part.

In some implementations, the parameters can include values that are used in higher level motion modifiers. For example, a high level sad walk motion modifier can be structured to receive a single parameter value that sets all of its modification primitives to particular values based on that single parameter value. For example, the single parameter value can control or scale different degrees of motion of a sad walk animation, e.g., small values can designate a slightly sad walk (closer to a neutral walk) and large values can designate an extreme sad walk.

In some implementations, a user can provide the one or more parameters to generate a particular modified animation from the base animation when the motion modifier(s) are applied to the base animation. For example, a user can specify parameters indicating particular frequency bands to filter from the base animation. In some examples, multiple sliders can be displayed in an editing interface displayed on a client device, each slider associated with a particular frequency band of frequencies included in the base animation. The positions of the sliders along their linear positional range specify the weights associated with low- to high-frequency signals in the base animation, and/or can specify to filter a particular frequency band to zero (e.g., move the slider associated with that band to 0). Low frequencies are present for large, general motion patterns, and high frequencies are present for detailed or subtle motion patterns, and/or noise.

In some implementations, parameters can be automatically (without user input) determined by a system, e.g., online metaverse platform 102, client device 110 or 116, and/or the system implementing the virtual experience. In some examples, one or more parameters for some motion modifiers may be determined based on statistical motion data obtained in block 210. For example, a parameter value may be determined as a function of (or otherwise based on) an attribute of the motion of the avatar in the base animation. The attribute is based on statistical motion data derived from motion of a body part of the avatar in the base animation, as described above for block 208. For example, a parameter for a position value scale or position offset modifier can be a function of a velocity attribute (e.g., mean velocity) of the body part having the motion being modified, where the greater the mean velocity of the body part, the greater the determined position value scale. In some implementations, the parameter can vary linearly or non-linearly based on the value of the attribute, e.g., as determined by a linear or non-linear function on which the parameter is based.

In another example, a parameter can be based on a statistical kinetic energy of the base animation to provide an energy-based transformation of the base animation. For example, a higher (and thus more energetic) scaling can be applied to position value scale and time scale of the animation curves of the base animation, if the base animation has a higher mean kinetic energy, and vice-versa.

In some implementations, a motion modifier can be generalized across motions with widely differing dynamics by conditioning its motion transformations on physical properties of the associated body part such as speed, acceleration, kinetic energy, etc. In some examples, a motion modifier for modifying motion of a body part of an avatar may only be applied to the body part if that body part is moving at least a mean minimum velocity in the base animation as determined from the statistical motion data.

In some implementations, each motion modifier in a hierarchy of motion modifiers can receive updated statistical data if the base animation has changed, so that the parameters for the motion modifiers that are based on this data are determined using the most recent statistical motion data. Block 210 may be followed by block 212.

In block 212, the base animation is modified to generate a modified animation by applying the motion modifier(s) and data determined in blocks 204 to 210 to the base animation. For example, one or more positions, timings, and/or frequencies of the animation curves of the base animation are modified to produce modified animation curves that provide the modified animation to body parts associated with the motion modifiers. In some implementations, a set of one or more motion modifiers can be applied to the base animation to produce a first modified animation, and a second set of one or more motion modifiers can be applied to the first modified animation to produce a second modified animation. Additional modifications can be applied similarly.

In some implementations, one or more of the motion modifiers may have been designated to modify motion of body parts based on one or more statistical parameters, e.g., indicating a center position (e.g., mean position or midpoint) in a range of motion of the body parts. For example, if a motion modifier is designated to apply a modification using a statistical center position, the motion modifier modifies the position of the associated body part using the statistical center position as a base position that is modified. For example, the center position is scaled or offset based on the parameter obtained in block 210.

In an example, a position value scale modifier can scale up a position of particular body part, e.g., to exaggerate the animation of the body part. For example, to make a walk animation appear more energetic, left upper arm and right upper arm animations are scaled. However, if the position of a particular body part is scaled by a scalar value without other adjustments, the result may not be as intended. For example, in a basic walk animation, the arm swings around a center of the avatar and scaling up the position of the arm at every keyframe provides a desired exaggerated arm swing. In a different walk animation, the arms may swing around behind the avatar, and if the position of the arms is scaled, the arms move further up behind the torso, an undesired effect. Using the statistical (e.g., mean) center position as described above allows the arms in either animation to be scaled around a center pivot angle as determined via the statistical position. Each motion modifier in a hierarchy can modify the motion of the arms based on the statistical center position. This enables modifications to be adjusted based on the motion in the base animation and allows a particular motion modifier to be configured for any base animation and avatar to provide appropriate modifications given the existing motion in a particular base animation.

In some implementations, the base animation can be blended with the modified animation that results from applying the motion modifiers to the base animation. In some implementations, a blended animation can be based on averaging the motions of the base and modified animations. In some implementations, a blended animation can be based on a combination of the corresponding positions of the avatar at corresponding time points of the base and modified animation curves to create a blended animation. Some implementations can use different weights for base animation and modified animation used in the blend. In some implementations, a gradual blend from the base animation to the modified animation can be performed, e.g., at a constant blending rate over the duration of the animation or at other blending rates. In some implementations, the blended animation can be stored as a separate animation. In some implementations, a first modified animation can be blended into a second modified animation. For example, a set of one or more motion modifiers can be applied to the base animation to produce a first modified animation, a second set of one or more motion modifiers can be applied to the first modified animation to produce a second modified animation, and the first and second animations can be blended similarly as described above, e.g., from the first animation to the second animation or vice-versa. Block 212 may be followed by block 214.

In block 214, the modified animation of block 212 can be applied to the avatar to move the avatar in the virtual environment according to the modified animation, in some implementations. For example, the portions of the avatar that are associated with the motion modifiers of block 206 are moved to the positions indicated in the modified animation curves at the points of time indicated in the modified animation curves.

In some implementations, the modified animation is stored as a new animation. Associated motion modifiers and/or related data (e.g., statistical motion data and/or parameters) used to determine the modified animation as described above can also be stored, e.g., for future access to modify other animations to provide similar motions to the modified animation.

Method 200 can be performed for each of multiple avatars in the virtual environment such that method 200 is independently performed multiple times, e.g., at least partially in parallel. In some implementations, method 200 can be repeatedly performed for a virtual environment, e.g., to repeatedly modify an animation over time as the virtual environment changes. For example, a modified animation can become a base animation for a successive modification to the avatar's animation. In some implementations, method 200 can be performed periodically and/or in response to particular events (e.g., one or more objects are created in or removed from the virtual environment, motion of one or more objects in the virtual environment, a user command that causes a user-controlled avatar to interact with one or more objects, etc.).

In various implementations, various blocks of method 200 may be combined, split into multiple blocks, performed in parallel, or performed asynchronously. In some implementations, one or more blocks of these methods may not be performed or may be performed in a different order than shown in these figures. Method 200, or portions thereof, may be repeated any number of times using additional inputs.

Figure 3:
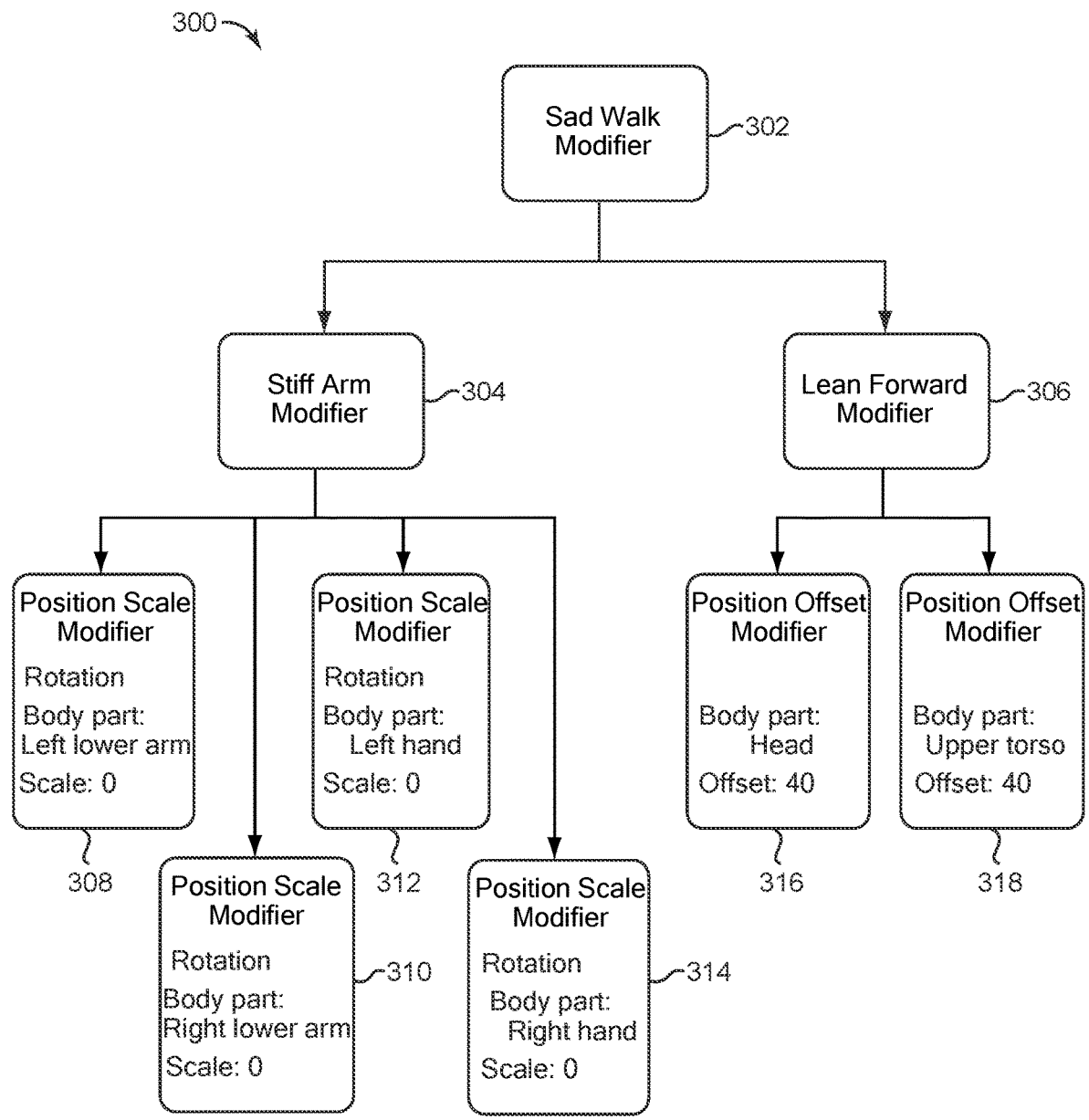
FIG. 3 is a diagrammatic illustration of example motion modifiers composed of multiple lower-level motion modifiers, in accordance with some implementations.

FIG. 3 is a diagrammatic illustration 300 of example motion modifiers composed of multiple lower-level motion modifiers, according to some implementations.

In this example, a motion modifier 302 is shown that can modify an animation to portray a particular emotional state, in this case a sad walk. For example, sad walk modifier 302 can be accessed in storage and/or can be organized in one or more categories of motion modifiers, e.g., emotional modifiers, sad modifiers, walk modifiers, etc.

In this example, sad walk modifier 302 is a higher level motion modifier that is composed of two lower-level motion modifiers, a stiff arm modifier 304 and a lean forward modifier 306. Each of the modifiers 304 and 306 are composed of multiple lower-level motion modifiers (e.g., modification primitives) at a lower level than the modifiers 304 and 306. For example, stiff arm modifier 304 is composed of position value scale modifiers 308, 310, 312, and 314. Position value scale modifier 308 scales the rotation of a particular body part of the avatar, the left lower arm, to a zero position, which causes the left lower arm to be positioned toward the feet of the avatar, e.g., in line with the left upper arm. Position value scale modifier 310 scales the right lower arm similarly as modifier 308 for the left lower arm. Position value scale modifier 312 scales the rotation of the left hand to zero so that it is aligned with the left lower arm, and position value scale modifier 314 similarly scales the right hand. These modifiers effectively remove the motion from the arms, thus causing the arms of the avatar to droop and become stiff.

In this example, lean forward modifier 306 is composed of position offset modifiers 316 and 318. Offset modifier 316 rotates the head of the avatar forward (e.g., about a joint in the neck of the avatar) by 40 degrees. This provides a head position to cause the avatar to appear as if it is looking downward for the duration of the animation. Offset modifier 318 rotates the upper torso of the avatar forward (e.g., about a joint in the waist of the avatar) by 40 degrees. This causes a torso position that provides additional downward orientation of the avatar for the duration of the animation. Both of these offset modifiers cause the avatar to assume a bent or droopy posture to emphasize the sad emotion. These modifiers thus causing the arms, torso, and head of the avatar to droop to correspond to the sad emotion intended by the modifier 302.

In some implementations, additional or other modifiers can be used in the modifier 302 to provide emotion-based modifications of a base animation. For example, a leg dragging modifier can be provided at the same hierarchical level as modifiers 304 and 306 (and provide lower level motion modifiers similar to modifiers 308-314 or 316-318), which can reduce the swing range of the legs of the avatar. In some examples, a sluggish time scale modifier can be provided at the same hierarchical level as modifiers 304 and 306, which can modify the time scale of the entire avatar (e.g., all of the avatar body parts in the sad walk animation) to emphasize sadness. For example, the sluggish modifier can expand the time duration of the animation so that the motions of the avatar in the animation are performed over a longer period of time. In some implementations, a time offset modifier can cause a delay in the timing of the motion of particular body parts such as legs and/or arms to indicate lethargy and sadness.

A user can decide which of the modifiers 304, 306, and any other modifiers, to apply to a base animation, and can modify any of the parameters of the modifiers, allowing a large range of different combinations and results without having to manually edit the base animation data (e.g., animation curve) of each body part of the avatar.

Figure 4:
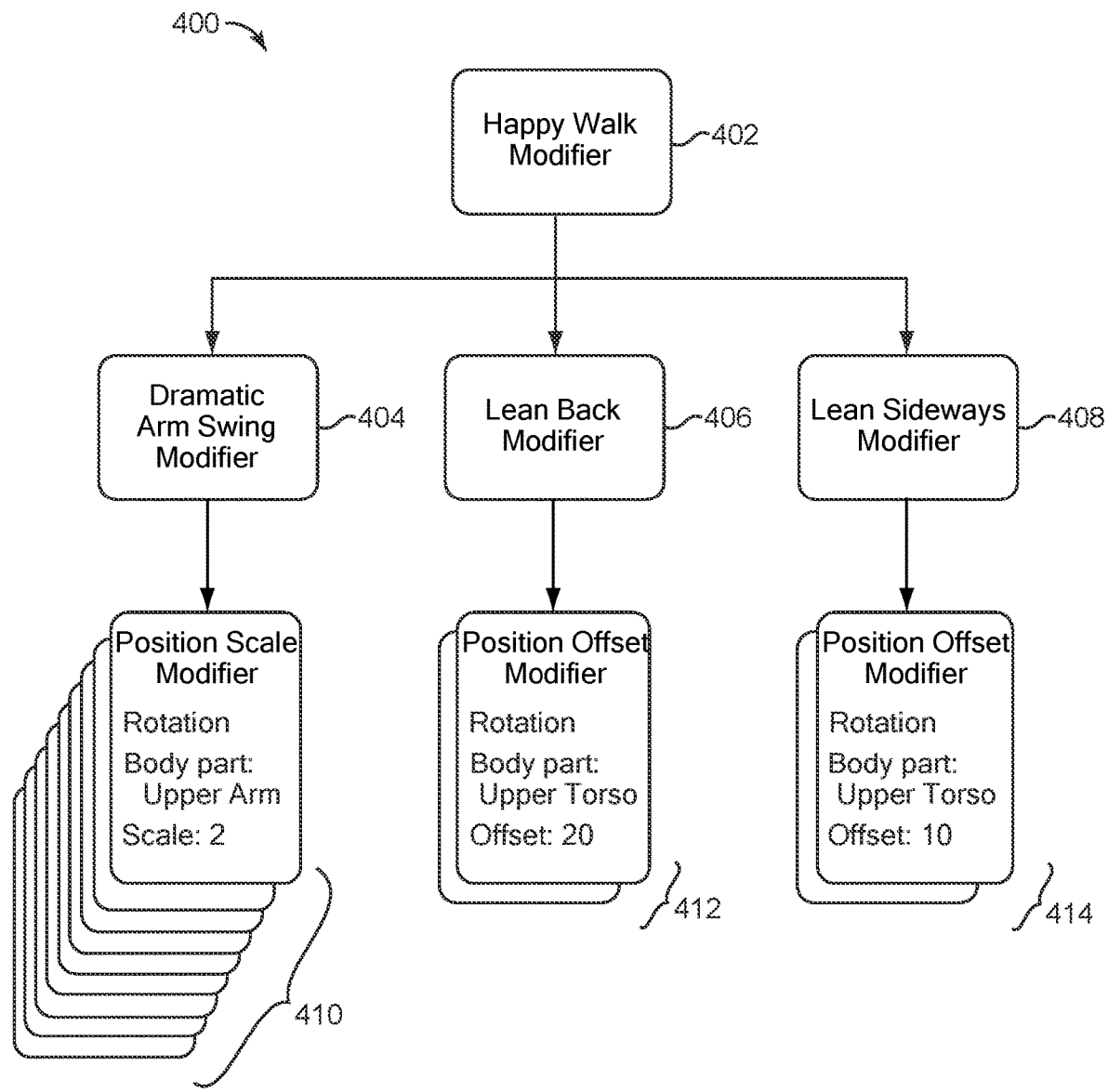
FIG. 4 is a diagrammatic illustration of additional example motion modifiers composed of multiple lower-level motion modifiers, in accordance with some implementations.

FIG. 4 is a diagrammatic illustration 400 of additional example motion modifiers composed of multiple lower-level motion modifiers, according to some implementations.

In this example, a motion modifier 402 is shown that can modify an animation to portray a happy emotional state, in this case a happy walk. For example, happy walk modifier 402 can be accessed in storage and/or can be organized in one or more categories of motion modifiers, e.g., emotional modifiers, happy modifiers, walk modifiers, etc.

In this example, happy walk modifier 402 is a higher level motion modifier that is composed of three lower-level motion modifiers, a dramatic arm swing modifier 404, a lean back modifier 406, and a lean sideways modifier 408. Each of the modifiers 404 to 408 are composed of multiple lower-level motion modifiers (e.g., modification primitives) at a lower level than the modifiers 404 to 408.

In some examples, dramatic arm swing modifier 404 can be composed of nine position value scale modifiers 410. These position value scale modifiers can include scale modifiers for scaling rotation of body parts of the avatar in the base animation including an upper torso, lower torso, head, left upper arm, left lower arm, left hand, right upper arm, right lower arm, and right hand. The scale values of these modifiers can cause the portions of the arms and torso of the avatar to rotate in larger arcs around their pivot points than in the base animation, e.g., by scaling the rotational movement of these body parts by 2 or more (each different body part can be scaled by a different amount in some implementations). In different implementations, a modifier can be composed of any number of position value scale modifiers.

In this example, lean back modifier 406 is composed of position offset modifiers 412. These offset modifiers can include a head rotation offset modifier and an upper torso modifier that rotate these body portions backward (e.g., away from the front of the avatar) around associated joints by a particular amount, such as 20 degrees. When applied to the base animation, these modifiers cause the head and torso of the avatar to lean back to provide a posture during a walk animation that is happier or more proud than a neutral posture. The position offset modifiers cause the motion of the head and torso (e.g., as also modified by the dramatic arm swing modifier 404) to pivot about a point or angle that is offset from the base animation by the offset magnitude.

The lean sideways modifier 408 is composed of offset modifiers 414. These offset modifiers can include an upper torso modifier that adds a rotation of the upper torso of the avatar of the base animation around a vertical axis of the avatar, and a head modifier that adds a similar rotation to the head of the avatar. These offsets rotate these body portions to a side of the avatar (e.g., away from the front of the avatar) around associated joints by a particular amount, e.g., 10 degrees.

In some implementations, one or more of the offset magnitudes can be dynamically determined as a value proportional to the current kinetic energy of the base animation. In some implementations, as described above with reference to block 208 of FIG. 2, statistical motion data can be obtained that indicates a kinetic energy magnitude of one or more body parts of the avatar, or in this example, the entire avatar in the animation. The offset magnitude of the upper torso and head (for the lean back modifier) can be specified as a value within a particular angular range that is proportional to the kinetic energy magnitude within a particular energy range. For example, if the energy range is 0 to 100, and the statistical kinetic energy of the base animation is 50, then the offset magnitude can be provided as 20 degrees around the joints of the upper torso and head, based on a possible angular range of the offset that is 0 to 40 degrees (where 20 degrees is 50% of the angular range).

The larger swings of the arms and backward rotation of the head and upper torso and the sideways rotation of the head and torso as provided by happy walk modifier 402 provide a more energetic and upward posture of the avatar to convey a happy or proud emotional state.

In some implementations, additional or other modifiers can be used to provide a happy emotion-based modifications of a base animation for happy walk modifier 302. For example, a time scale modifier can be provided at the same hierarchical level as modifiers 404 to 408, which can hasten or speed up a walk animation to further emphasize energetic walking. For example, the speed modifier can reduce the time duration of the all the avatar motions so that the avatar motions of the animation taker a shorter amount of time. In some implementations, time periods can be removed from the durations of one or more body part animations to speed up motions.

A user can decide which of the modifiers 404, 406, and/or 408, and any other modifiers, to apply to a base animation, and can modify any of the parameters of the modifiers, allowing a large range of different combinations and results without having to manually edit the base animation data (e.g., animation curve) of each body part of the avatar.

Figure 5:
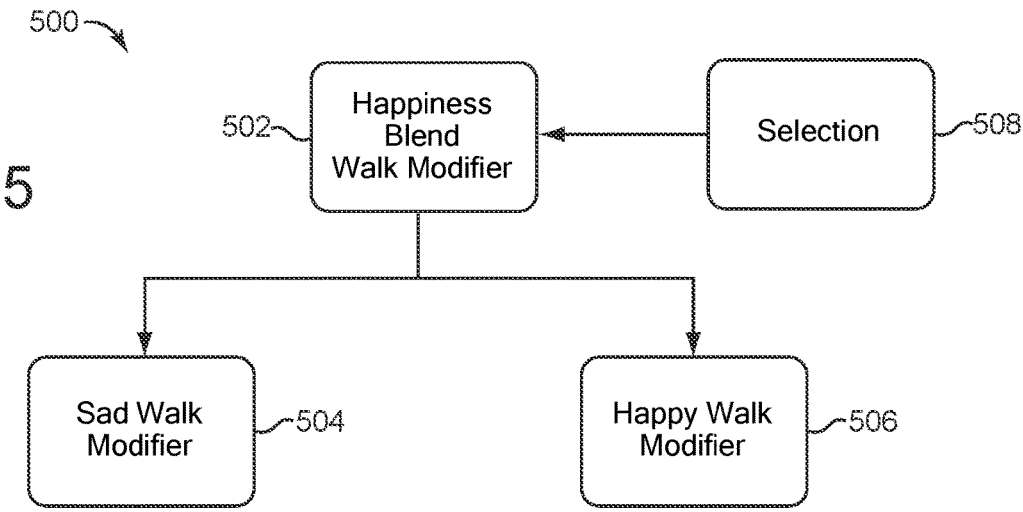
FIG. 5 is a diagrammatic illustration of an example blending motion modifier that blends multiple motion modifiers to obtain a modified animation, according to some implementations.

FIG. 5 is a diagrammatic illustration 500 of an example blending motion modifier that blends multiple motion modifiers to obtain a modified animation, according to some implementations.

A blending motion modifier can be created from two other motion modifiers. In this example, a happiness blend walk modifier 502 can be created from a combination of a sad walk modifier 504 and a happy walk modifier 506. For example, sad walk modifier 504 can be sad walk modifier 302 of FIG. 3, and happy walk modifier 506 can be happy walk modifier 402 of FIG. 4.

The blend walk modifier 502 can blend motion modifications from the sad walk modifier 504 and the happy walk modifier 506 and apply them to a base animation. For example, the blend can be a transition from application of one modifier to application of the other modifier over the duration of the base animation. This allows the avatar's emotional state to smoothly transition from one emotional modification to the other emotional modification, which manifests in the avatar motion adapting to a new emotion over the duration of the animation, e.g., regardless of the motions it is currently performing.

In some examples, only the sad walk modifier is applied to initial times (e.g., initial frames) of the base animation to cause the avatar in the animation to express sadness. A gradually-increasing amount of modification from the happy walk modifier 506 can be applied at later times (e.g., later frames) of the base animation, alongside a gradually-decreasing amount of modification from the sad walk modifier being applied. The amount of modification applied to the base animation from each modifier can be scaled by scaling the magnitudes of the parameters of the lower-level modifiers in those modifiers. For example, the magnitudes of position value scale, position offsets, and frequency modifications can be scaled such that the contributions of the sad walk and happy walk modifiers add to 100%. For example, the sad walk modifier can start at 100% of its modification applied, followed by 90% sad walk and 10% happy walk modification, followed by 80% sad walk and 20% happy walk modification, and so on, ending at 100% happy walk modification applied.

In some implementations, a selection block 508 can provide selection input to the blend walk modifier that specifies one or more blend parameters. The selection input can be based on user input, e.g., received via a client device or other device. For example, blend parameters can specify an amount of blend between modifier 504 and modifier 506, e.g., percentage contributions from each modifier, and can specify a rate of increase or decrease of the use of a particular modifier. The user input can select to start with sad walk modifications and blend toward happy walk modifications, to start with happy walk modifications and blend toward sad walk modifications, etc. In some implementations, the selection layer can be omitted, and a blend based on default blend parameters can be used.

In some implementations, blend modifier 502 can apply a constant blend throughout the animation, e.g., set at 20% sad walk and 80% happy walk. In some implementations, the blend modifier can apply different mixes of sad and happy modifiers at different time points of the animation, which need not be a gradual transition from the use of one modifier to use of the other modifier. In some implementations, three or more motion modifiers can be blended, such as sad walk modifier 504, happy walk modifier 506, and an energetic walk modifier that adds, for example, more vertical motion to the walk animation.

In some implementations, the blend modifier 502 can be created and stored (e.g., with default blend parameters) for later access and execution. In some implementations, blend modifier 502 can be applied to a base animation and the blended modified animation is stored for later application to an avatar. In some implementations, blend modifier 502 can be applied in real-time to base animation of an avatar being displayed, e.g., applied to animation data that is received as streaming data from a different device over a communications network.

Figure 6:
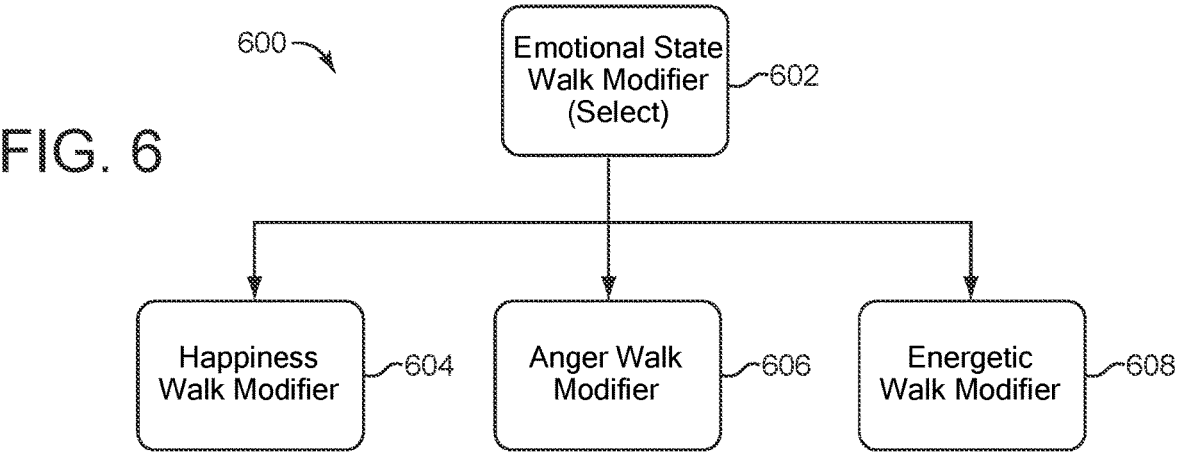
FIG. 6 is a diagrammatic illustration of an example modifier selector that can dynamically select a motion modifier to modify an animation based on one or more conditions of avatar or environment, in accordance with some implementations.

FIG. 6 is a diagrammatic illustration 600 of an example modifier selector that can dynamically select a motion modifier to modify an animation based on one or more conditions of avatar or environment, according to some implementations.

A motion modifier selector can be used to select one of multiple motion modifiers to modify a base animation, where the selection can be based on one or more conditions. In this example, an emotional state walk modifier includes a selector that can select a motion modifier to use from available modifiers including a happiness walk modifier 604 (e.g., which can be similar to the happiness blend walk modifier of FIG. 5, or can be a different modifier), an anger walk modifier 606, and an energetic walk modifier 608.

For example, the emotional state walk modifier 602 can select the happiness walk modifier 604 to modify a current walking animation of an avatar in real time in a virtual experience that is currently executing, e.g., on a metaverse platform 102. The selection can be based on a happy emotion of the avatar as indicated by the virtual experience software. Later, the emotional state walk modifier 602 can select the anger walk modifier 606 that modifies the avatar walking animation to an angry animation, e.g., a stomping and rigid posture, based on one or more events that have occurred in the virtual experience (e.g., being obstructed from a location that the avatar was moving toward). At some later point during the virtual experience, the emotional state walk modifier 602 can select the energetic walk modifier 608 that provides an energetic walk that is different from the happiness walk provided by the happiness walk modifier 604 (e.g., different amounts of motion of body parts of the avatar).

In some implementations, multiple high-level modifiers such as selection modifier 602 can be used to modify animations based on a variety of different emotional states or moods of the animated avatar or the user controlling the avatar, based on user or player input, based on events within a virtual experience, etc. Such selection modifiers allow motion of an avatar to adapt dynamically based on changing conditions in a virtual environment, by selecting from existing motion modifiers without having to manually create separate animations, and without the system having to retrieve and process separate individual animations.

In some implementations, one or more of the available modifiers that can be selected (e.g., modifiers 604, 606, and 608) can be blended (as described above), e.g., to a degree indicated by blend parameters provided by user input or based on particular events (e.g., a greater percentage of the anger walk modifier based on the number of times the user has failed to achieve an objective in a game).

Figure 7:
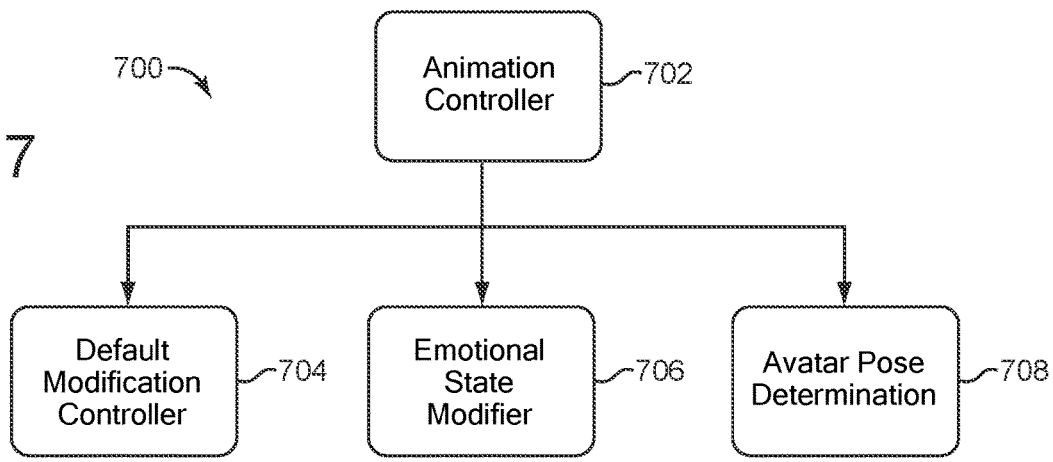
FIG. 7 is a diagrammatic illustration of an example animation control framework that can support modification of avatar animations in a metaverse platform or other system, according to some implementations.

FIG. 7 is a diagrammatic illustration 700 of an example animation control framework that can support modification of avatar animations in a metaverse platform or other system, according to some implementations.

In this example, an animation controller 702 can provide a framework that can be used to integrate avatar animation operations described herein with other operations of a system. For example, controller 702 can select any of multiple components for use, including a default modification controller 704, an emotional state modifier 706, and an avatar pose determination block 708. The example components described for FIG. 7, including animation controller 702 and blocks 704, 706, and 708, can be implemented on system such as the online metaverse platform 102, and/or one or more client devices 110 and 116. Other components can be included in systems of various implementations.

Default modification controller 704 can be used to select and apply general modifications to base animations, e.g., using low-level modification primitives as well as higher level motion modifiers as described above. The parameters for these modification primitives that control the magnitudes of modifications to animations can be based on the particular modification being performed, e.g., as determined by a user, based on statistical motion data, copied parameters from a similar existing motion modifier, etc., as described above.

Emotional state modifier 706 can be, for example, emotional state walk modifier 602 described above with reference to FIG. 6, and/or can include other emotional state modifiers that modify an animation such that the motion of the avatar conveys a particular emotion. For example, the animation controller 702 can select emotional state modifier 706 to automatically (without user input) select a particular modifier to apply to an animation based on an emotion to be conveyed by the animation. Controller 702 can control emotional state modifier 706 to transition from modifying an animation that expresses one emotion to an animation expressing a different emotion, e.g., by blending motion modifiers as described above.

Avatar pose determination block 708 can be used to determine poses of avatars. For example, inverse kinematics can be used to determine a pose of an avatar to satisfy a constraint (e.g., a hand of an avatar that is to touch an object in a virtual environment). Motion modifiers described herein can operate on a body pose which can be generated by an upstream system (e.g. motion capture data, hand-crafted animations, or a procedural system like block 708). For example, motion modification processes can query and modify the pose data.

Any number of complex modifiers can be integrated into the animation control framework to support animation modification, including runtime modification of avatar motion.

In some implementations, animation controller 702 is able to control the motion of avatars by modifying animations, e.g., modifying base animations, compositing (blending, additively layering) different animations, etc. In some implementations, animation controller 702 can synthesize animations by creating motion graphs that join animation clips or motion capture data to form motion of an avatar, e.g., in a graph-based animation system. The motion modifiers described herein can be used to modify such animation clips or motion capture data.

Figure 8:
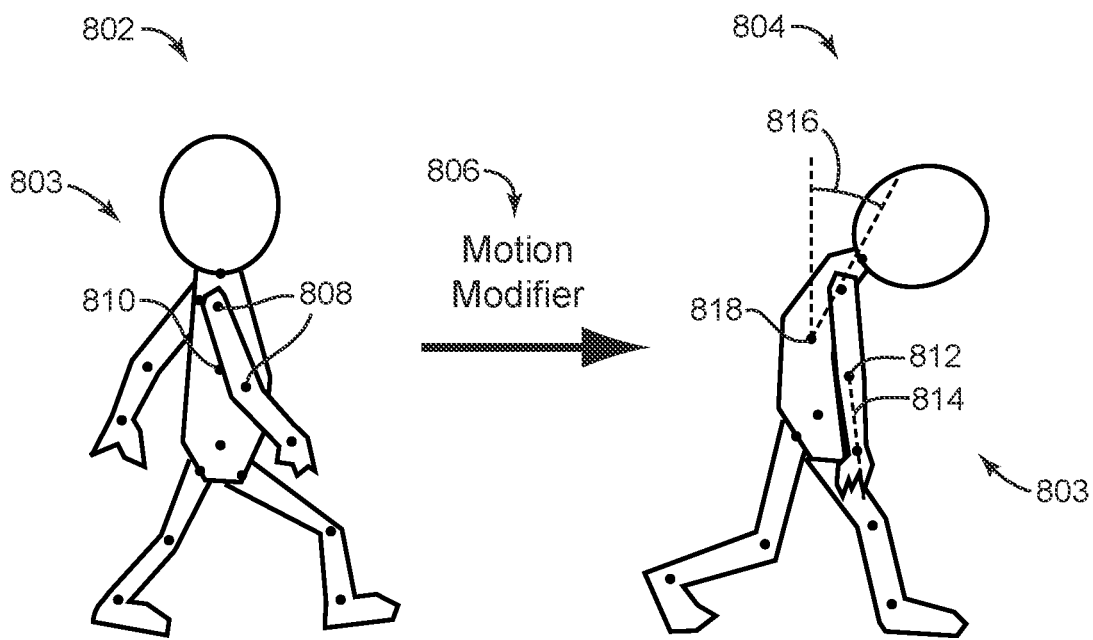
FIGS. 8 and 9 are diagrammatic illustrations of example modifications of an avatar animation, in accordance with some implementations.

FIG. 8 is a diagrammatic illustration of an example modification of an avatar animation, in accordance with some implementations. In this example, a base animation 802 of an avatar 803 is a neutral or standard walking animation in a virtual environment of a virtual experience (one frame or avatar position of the base animation is shown in FIG. 8). Avatar 803 includes several body parts including a head, two arms, an upper torso, a lower torso, and two legs. Avatar 803 can include a joint 808 for each such body part (not displayed to a user of the virtual experience), where the joints can be joints of a skeleton or rig of the avatar. For example, a respective joint 808 can be provided for the neck, upper arm (shoulder), lower arm (elbow), hand (wrist), upper leg, lower leg (knee), foot (ankle), upper torso, lower torso, etc. A joint 810 for the upper torso is indicated in FIG. 8.

A sad walk motion modifier 806 is applied to the animation of the avatar 803 to generate a modified animation 804 (an example frame or avatar position of the modified animation is shown in FIG. 8). Modified animation 804 is a sad walk animation that expresses a sad emotion of the avatar 803. For example, a sad walk modifier that is similar to modifier 302 of FIG. 3 can be used. The sad walk modifier can include a stiff arm modifier (e.g., modifier 304 of FIG. 3) and a lean forward modifier (e.g., modifier 306 of FIG. 3).

In some examples, the stiff arm modifier is a position value scale modifier that includes modification primitives that scale the angle rotation of lower arms around lower arm (elbow) joint 812 based on a magnitude parameter of zero (relative to the upper arms) during the animation, so that the arms extend straight down along a zero angle 814. The lean forward modifier provides a rotational angle offset 816 to the upper torso of the avatar about the upper torso joint 818 based on a torso offset parameter, and also provides a rotational angle offset to the head of the avatar in a downward direction based on a head offset parameter. These modifications cause the avatar to move in a down-looking manner to convey a sadness emotion.

In some implementations, additional modifiers can also be applied to the animation 802, such as time scale modifications to slow down the entire animation, time scale modifications to the motion of one or more body parts (e.g., to the legs to slow leg movement), etc.

Figure 9:
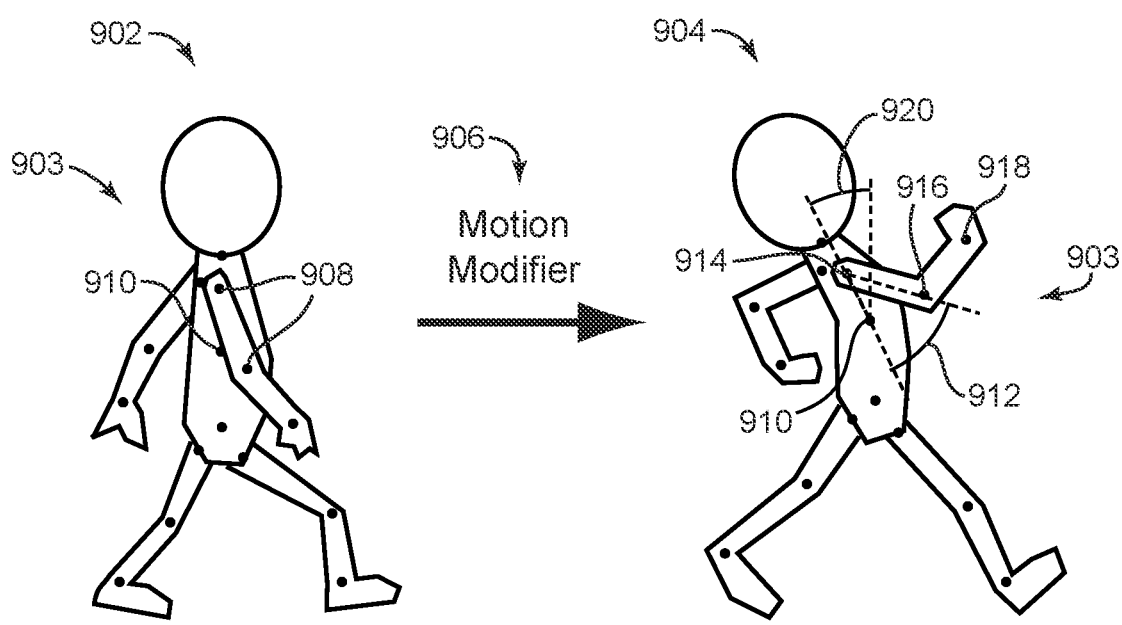

FIG. 9 is a diagrammatic illustration of another example modification of an avatar animation, in accordance with some implementations. In this example, similar to the base animation 802 of FIG. 8, a base animation 902 of an avatar 903 is a neutral or standard walking animation in a virtual environment (one frame or avatar position of the base animation is shown in FIG. 9). Avatar 903 includes several body parts including a head, two arms, an upper torso, a lower torso, and two legs. Avatar 903 can include a joint 908 for each such body part, where the joints are indicated by dots in FIG. 9 and can be joints of a skeleton or rig of the avatar. For example, a respective joint 908 can be provided for the neck, upper arm (shoulder), lower arm (elbow), hand (wrist), upper leg, lower leg (knee), foot (ankle), upper torso, lower torso, etc. A joint 910 for the upper torso is indicated in FIG. 9.

A happy walk motion modifier 906 is applied to the animation of the avatar 903 to generate a modified animation 904 (one frame or avatar position of the modified animation is shown in FIG. 9). Modified animation 904 is a happy walk animation that expresses a happy emotion of the avatar 903. For example, a happy walk modifier that is similar to modifier 402 of FIG. 4 can be used. The happy walk modifier can include a dramatic arm swing modifier (e.g., modifier 404 of FIG. 4), a lean back modifier (e.g., modifier 406 of FIG. 4), and a lead sideways modifier (e.g., modifier 408 of FIG. 4).

In some examples, the dramatic arm swing modifier is a scale modifier that scales the angle rotation of multiple body parts of the avatar to rotate in greater range than in the base animation 902. Each body part is modified by a respective modification primitive that scales its rotation to provide greater motion, including body parts of the upper arms, lower arms, hands, upper torso, lower torso, and head. For example, the rotation around the joints of these body parts is increased by a scale parameter of 2 (various body parts can have different amounts of scaling in some implementations). This scaling causes, for example, the upper arm to rotate further than in base animation 902, e.g., by an increased rotational amount 912 about the upper arm joint 914. Similarly, the lower arm motion and hand motion are modified to have an increased rotational range about their associated joints 916 and 918, respectively, compared to the base animation 902.

The lean back modifier provides a rotational angle offset 920 to the upper torso of the avatar about the upper torso joint 910 based on a torso offset parameter, and also provides a rotational angle offset to the head of the avatar in a backward direction based on a head offset parameter. These modifications, in addition to the greater scaling of upper and lower torso rotation of the dramatic arm swing modifier, cause the motions of these body parts to rotate around a position that is further toward the back of the avatar, thus causing the avatar to move in an upright style that expresses a happiness emotion. The lean sideways modifier can provide rotational angle offsets to the motion of the head and upper torso of the avatar, so that these body part motions are shifted to one side (not shown in FIG. 9), to indicate a more whimsical motion of the avatar.

In some implementations, additional modifiers can also be applied to the base animation 902, such as time scale modifications to hasten or speed up the entire animation, time scale modifications to the motion of one or more body parts (e.g., to the legs to increase leg movement), etc.

In some implementations, as described above with reference to FIG. 6, the sad walk animation 804 of FIG. 8 and the happy walk animation 904 can be blended by particular degrees and/or in varying amounts over the animation, e.g., by a degree and/or blend rate specified by blend parameters, user input, etc.

Various implementations as described herein are implemented with specific user permission for use of user data, e.g., user-created content, avatars, commands for avatars, animations, etc. The user is provided with a user interface that includes information about how the user's information is collected, stored, and analyzed, and enables the user to control such use of the user's information. For example, the user interface requires the user to provide permission to use any information associated with the user. The user is informed that the user information may be deleted by the user, and the user may have the option to choose what types of information are provided for different uses. The use of the information is in accordance with applicable regulations and the data is stored securely. Data collection is not performed in certain locations and for certain user categories (e.g., based on age or other demographics), the data collection is temporary (i.e., the data is discarded after a period of time), and the data is not shared with third parties. Some of the data may be anonymized, aggregated across users, or otherwise modified so that specific user identity cannot be determined.

Figure 10:
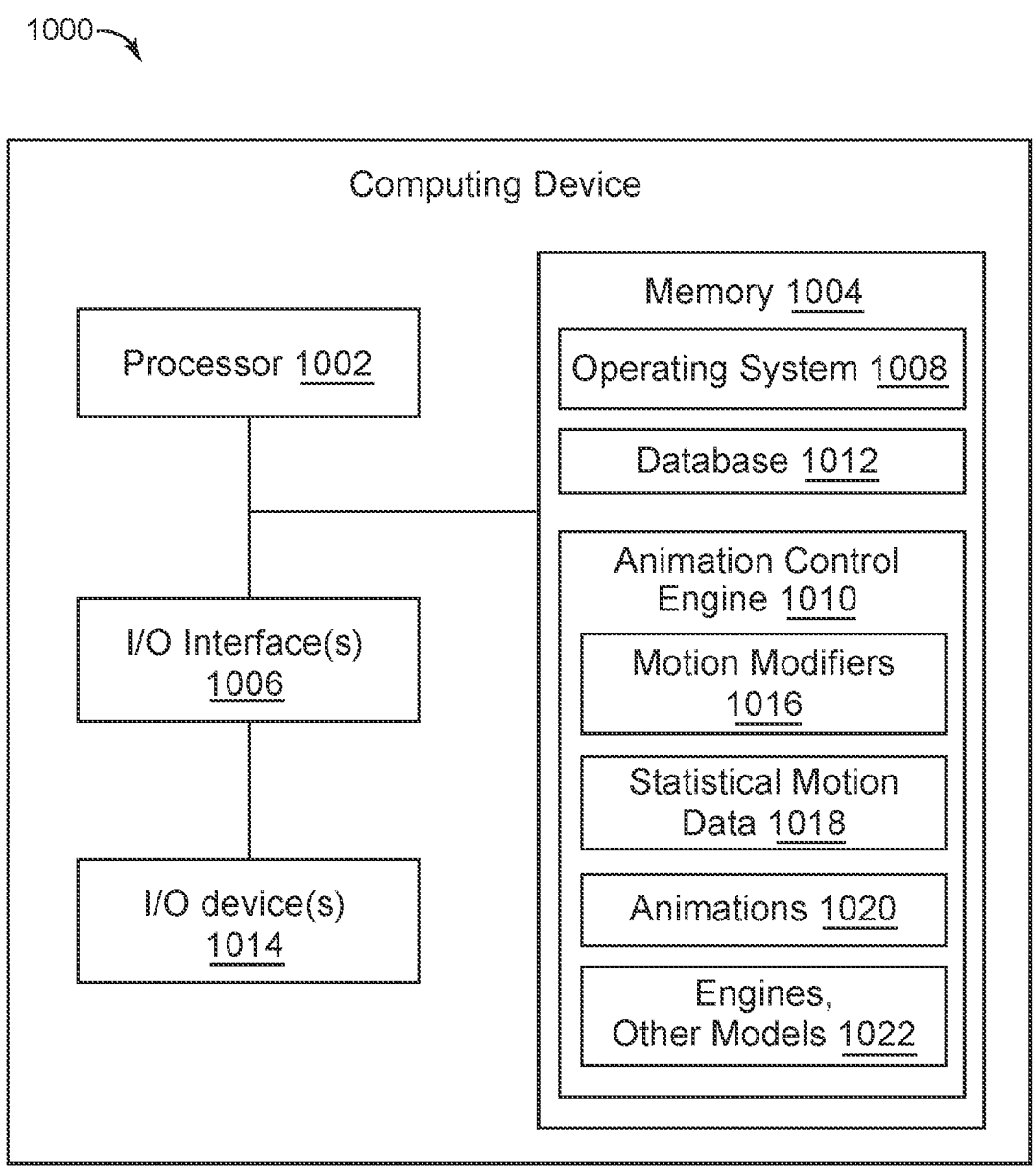
FIG. 10 is a block diagram illustrating an example computing device which may be used to implement one or more features described herein, in accordance with some implementations.

FIG. 10 is a block diagram of an example computing device 1000 which may be used to implement one or more features described herein, in accordance with some implementations. In one example, device 1000 may be used to implement a computer device (e.g., 102, 110, and/or 116 of FIG. 1), and perform appropriate method implementations described herein. Computing device 1000 can be any suitable computer system, server, or other electronic or hardware device. For example, the computing device 1000 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 1000 includes a processor 1002, a memory 1004, input/output (I/O) interface 1006, and audio/video input/output devices 1014 (e.g., display screen, touchscreen, display goggles or glasses, audio speakers, microphone, etc.).

Processor 1002 can be one or more processors and/or processing circuits to execute program code and control basic operations of the device 1000. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1004 is typically provided in device 1000 for access by the processor 1002, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1002 and/or integrated therewith. Memory 1004 can store software operating on the server device 1000 by the processor 1002, including an operating system 1008, an animation control engine 1010, and associated data 1012. In some implementations, animation control engine 1010 (and/or other engines) can include instructions that enable processor 1002 to perform functions described herein, e.g., some or all of the methods and implementations of FIG. 2.

For example, memory 1004 can include software instructions for animation control engine 1010 that can provide animation modification features as described herein, e.g., for an online metaverse platform 102 or other device or system. In some implementations, animation control engine 1010 can be or include animation controller 702 of FIG. 7. Any of software in memory 1004 can alternatively be stored on any other suitable storage location or computer-readable medium. Various engines, modules, instructions, machine learning models, software code, and other blocks used in described features can be stored in memory 1004 and/or other connected storage devices (e.g., database 1012). For example, memory 1004 and/or database 1012 can store motion modifiers 1016 of various hierarchical levels which can be selected and used to modify animations as described herein. Statistical motion data 1018 for animations, e.g., as accessed in block 208 of FIG. 2, can be stored in memory 1004 and/or other storage. Memory 1004 and/or database 1012 can store animations 1020 can include animation curves and other data that indicate positions of avatars over time and/or in frames, including base animations and modified animations that can be used to animate avatars. Other engines and models 1022 can also be stored (e.g., for determining avatar poses, etc.) in memory 1004. Memory 1004 and database 1012 (and/or other connected storage device(s)) can store instructions and data used in the features described herein, including parameters used by motion modifiers, etc. Memory 1004 and any other type of storage (magnetic disk, optical disk, magnetic tape, or other tangible media) can be considered "storage" or "storage devices."

I/O interface 1006 can provide functions to enable interfacing the server device 1000 with other systems and devices. For example, network communication devices, storage devices (e.g., memory and/or data store 108), and input/output devices can communicate via interface 1006. In some implementations, the I/O interface can connect to interface devices including input devices (keyboard, gamepad or other game controller, pointing device, touchscreen, microphone, camera, scanner, etc.) and/or output devices (display device, speaker devices, printer, motor, etc.).

For ease of illustration, FIG. 10 shows one block for each of processor 1002, memory 1004, I/O interface 1006, software blocks 1008 and 1010, and database 1012. These blocks may represent one or more processors or processing circuitries, operating systems, memories, I/O interfaces, applications, and/or software modules. In other implementations, device 1000 may not have all of the components shown and/or may have other elements including other types of elements instead of, or in addition to, those shown herein. While the online metaverse platform 102 may be described as performing operations as described in some implementations herein, any suitable component or combination of components of online gaming platform 102 or similar system, or any suitable processor or processors associated with such a system, may perform the operations described.

A user device can also implement and/or be used with features described herein, e.g., client devices 110 and 116. Example user devices can be computer devices including some similar components as the device 1000, e.g., processor(s) 1002, memory 1004, and I/O interface 1006. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 1014, for example, can be connected to (or included in) the device 1000 to display images pre- and post-processing as described herein, where such display device can include any suitable display device, e.g., an LCD, LED, or plasma display screen, CRT, television, monitor, touchscreen, 3-D display screen, headset, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., method 200) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Various implementations described herein may include processing and storing data. Data collection is performed only with specific user permission and in compliance with applicable regulations. The data are stored in compliance with applicable regulations, including anonymizing or otherwise modifying data to protect user privacy. Users are provided clear information about data collection, storage, and use, and are provided options to select the types of data that may be collected, stored, and utilized. Further, users control the devices where the data may be stored (e.g., user device only; client+server device; etc.) and where the data analysis is performed (e.g., user device only; client+server device; etc.). Data are utilized for the specific purposes as described herein. No data is shared with third parties without express user permission.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   determining, by at least one processor, a base animation defined by a plurality of animation curves, each animation curve including position values that indicate positions of an associated portion of an avatar at multiple points of time;
   determining, by the at least one processor, one or more motion modifiers, wherein each of the one or more motion modifiers is composed of one or more modification primitives configured to modify a respective animation curve of the base animation, the respective animation curve associated with a respective portion of the avatar;
   determining, by the at least one processor, one or more respective parameters of each of the one or more motion modifiers; and
   modifying, by the at least one processor, the base animation to generate a modified animation, wherein modifying the base animation includes applying the one or more motion modifiers to the base animation, wherein each of the one or more modification primitives of each motion modifier modifies the respective animation curve based on at least one of the one or more respective parameters of the motion modifier.

2. The computer-implemented method of claim 1, wherein each of the one or more modification primitives modifies at least one of: one or more position values of the associated portion of the avatar, a timing of a motion in the base animation, or a frequency of motion provided by the respective animation curve.

3. The computer-implemented method of claim 1, wherein determining the base animation includes one of:
   obtaining, as the base animation, an existing animation that has been previously generated, or
   generating the base animation, wherein generating the base animation includes generating a plurality of generic animation curves having no specified position values, or default position values, for the associated portions of the avatar.

4. The computer-implemented method of claim 1, wherein the base animation includes streaming animation data received by the at least one processor, and wherein modifying the base animation is performed as the streaming animation data is received.

5. The computer-implemented method of claim 1, wherein at least one of the one or more respective parameters specifies a magnitude of the modifying of the animation curve by the one or more modification primitives.

6. The computer-implemented method of claim 1, wherein at least one of the one or more respective parameters is based on user input received from a user by a device that includes the at least one processor.

7. The computer-implemented method of claim 1, wherein determining the one or more respective parameters includes generating at least one of the one or more respective parameters based on statistical motion data derived from motion provided by the base animation.

8. The computer-implemented method of claim 1, wherein the avatar is included in a virtual environment, and further comprising applying the modified animation to the avatar to cause the avatar to move according to the modified animation in the virtual environment.

9. The computer-implemented method of claim 1, wherein applying the one or more motion modifiers includes applying a position value scale modification primitive that scales the position values of the respective animation curve of the base animation by a scale factor included in the one or more respective parameters.

10. The computer-implemented method of claim 1, wherein applying the one or more motion modifiers includes applying a value offset modification primitive that offsets position values of the respective animation curve of the base animation by a particular amount included in the one or more respective parameters.

11. The computer-implemented method of claim 1, wherein applying the one or more of motion modifiers includes applying a time modification primitive that modifies a timing of the respective animation curve of the base animation based on the one or more respective parameters.

12. The computer-implemented method of claim 1, wherein applying the one or more motion modifiers includes applying a frequency modification primitive that modifies a frequency of a motion provided by the respective animation curve of the base animation by an amount indicated in the one or more respective parameters.

13. The computer-implemented method of claim 1, wherein the modified animation is an emotion-based animation that indicates an emotion of the avatar via motion of the avatar provided by the modified animation.

14. The computer-implemented method of claim 13, wherein the emotion-based animation includes one or more of:
    particular motion of one or more arms of the avatar generated by a first plurality of motion modifiers modifying the base animation by changing motion of the one or more arms of the avatar, and
    particular motion of one or more of: a head or a torso of the avatar generated by a second plurality of motion modifiers modifying the base animation by changing motion of the head or the torso of the avatar.

15. The computer-implemented method of claim 1, wherein the one or more motion modifiers include a first set of motion modifiers and a second set of motion modifiers and wherein modifying the base animation includes blending a first animation into a second animation, wherein:
    the first animation is generated by applying the first set of motion modifiers to the animation curves to produce first animation curves; and
    the second animation is generated by applying the second set of the motion modifiers to the first animation curves to produce second animation curves.

16. The computer-implemented method of claim 1, wherein determining the one or more motion modifiers is based, at least in part, on at least one of:
    a current state of the avatar in a virtual environment, or
    a current state of the virtual environment.

17. The computer-implemented method of claim 1, wherein at least one parameter of the one or more parameters is a function of an attribute of motion of the avatar in the base animation, wherein the attribute of motion is based on statistical motion data derived from motion of an associated body part of the avatar in the base animation.

18. The computer-implemented method of claim 1, wherein the one or more motion modifiers include a higher level motion modifier that applies a plurality of lower level motion modifiers to the base animation, wherein each of the lower level motion modifiers applies at least one of the one or more modification primitives to the base animation.

19. A system comprising:
    at least one processor; and
    a memory coupled to the at least one processor, with software instructions stored thereon that, when executed by the at least one processor, cause the at least one processor to perform operations including:
    determining a base animation defined by a plurality of animation curves, each animation curve including position values that indicate positions of an associated portion of an avatar at multiple points of time;
    determining one or more motion modifiers, wherein each of the one or more motion modifiers is composed of one or more modification primitives configured to modify a respective animation curve of the base animation, the respective animation curve associated with a respective portion of the avatar;
    determining one or more respective parameters of each of the one or more motion modifiers, wherein at least one of the one or more respective parameters specifies a magnitude of an animation modification by a respective modification primitive of the one or more modification primitives; and
    modifying the base animation to generate a modified animation, wherein modifying the base animation includes applying the one or more motion modifiers to the base animation, wherein each of the one or more modification primitives of each motion modifier modifies the respective animation curve based on at least one of the one or more respective parameters of the motion modifier.

20. A non-transitory computer-readable medium with instructions stored thereon that, when executed by a processor, cause the processor to perform operations comprising:
    determining a base animation defined by a plurality of animation curves, each animation curve including position values that indicate positions of an associated portion of an avatar at multiple points of time;
    determining one or more motion modifiers, wherein each of the one or more motion modifiers is composed of one or more modification primitives configured to modify a respective animation curve of the base animation, the respective animation curve associated with a respective portion of the avatar;
    determining one or more respective parameters of each of the one or more motion modifiers; and
    modifying the base animation to generate a modified animation, wherein modifying the base animation includes applying the one or more motion modifiers to the base animation, wherein each of the one or more modification primitives of each motion modifier modifies the respective animation curve based on at least one of the one or more respective parameters of the motion modifier.

* * * * *